United States Patent [19]
Reddig et al.

[11] Patent Number: 5,319,074
[45] Date of Patent: Jun. 7, 1994

[54] BIFUNCTIONAL REACTIVE DYESTUFFS CONTAINING VINYLSULPHONE OR ALKYLSULPHONE GROUPS AND A 2,4 DIFLUORO PYRIMIDINE GROUP

[75] Inventors: Wolfram Reddig, Gladbach; Karl-Josef Herd, Odenthal; Ernst Kysela, Gladbach, all of Fed. Rep. of Germany

[73] Assignee: Bayer Aktiengesellschaft, Leverkusen, Fed. Rep. of Germany

[21] Appl. No.: 825,239

[22] Filed: Jan. 24, 1992

[30] Foreign Application Priority Data

Jan. 31, 1991 [DE] Fed. Rep. of Germany ....... 4102777

[51] Int. Cl.$^5$ .................... C09B 62/20; C09B 62/24; C09B 62/245; C09B 62/255; C09B 62/25; D06P 1/38; D06P 1/382; D06P 1/384
[52] U.S. Cl. .................................. 534/618; 534/617; 534/622; 534/625; 534/626; 534/627; 534/628; 534/629; 534/632; 534/635; 534/636; 534/638; 534/642; 534/637; 540/131; 540/132; 540/133; 540/134; 540/139; 544/99; 544/100; 544/101; 544/102; 544/103; 544/104
[58] Field of Search .............. 534/619, 627, 628, 618, 534/622, 632, 633, 634, 635, 625, 626, 636, 637, 638, 642; 540/131–134, 139; 544/99–104

[56] References Cited

U.S. PATENT DOCUMENTS

| | | | |
|---|---|---|---|
| 4,560,388 | 12/1985 | Rohrer | 534/638 X |
| 4,746,732 | 5/1988 | Tzikas, I | 534/638 X |
| 4,935,501 | 6/1990 | Tzikas, II | 534/638 X |
| 4,996,304 | 2/1991 | Tzikas, III | 534/638 X |
| 5,095,102 | 3/1992 | Herd et al. | 534/638 |

FOREIGN PATENT DOCUMENTS

| | | | |
|---|---|---|---|
| 0128340 | 12/1984 | European Pat. Off. | 534/638 |
| 0203505 | 12/1986 | European Pat. Off. | 534/638 |
| 0318785 | 6/1989 | European Pat. Off. | 534/638 |
| 3318146 | 11/1984 | Fed. Rep. of Germany | 534/638 |
| 3800261 | 7/1989 | Fed. Rep. of Germany | 534/638 |

OTHER PUBLICATIONS

Patent Abstracts of Japan, vol. 12, No. 353 (C-530)(3200) Sep. 21, 1988 Mitsubishi.

*Primary Examiner*—Floyd D. Higel
*Attorney, Agent, or Firm*—Sprung Horn Kramer & Woods

[57] ABSTRACT

A metal-free dyestuff of the formula

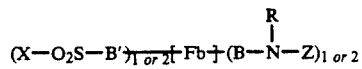

and metal complex thereof wherein:
Fb = the radical of a dyestuff selected from the group consisting of mono- or polyazo, anthraquinone, phthalocyanine, formazan, dioxazine and triphenylmethane radicals,
B and B' = a direct bond or an aliphatic or aromatic bridge member to a ring C atom of an aromatic-carbocyclic ring or to a ring C or N atom or an aromatic-heterocyclic ring in Fb,
X = CH=CH$_2$ or CH$_2$CH$_2$—Y, wherein
Y = OSO$_3$H, SSO$_3$H, OCOCH$_3$, OPO$_3$H$_2$, OSO$_2$CH$_3$, SCN, NHSO$_2$CH$_3$—, Cl, Br, F, OCOC$_6$H$_5$, OSO$_2$—C$_6$H$_4$CH$_3$,

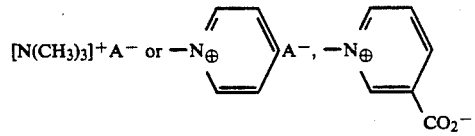

R = H or C$_1$–C$_4$-alkyl, which is optionally be substituted by halogen, hydroxy, cyano, C$_1$–C$_4$-alkoxy, carboxyl, sulpho or sulphato,
Z = a fiber-reactive radical of the formula
(Abstract continued on next page.)

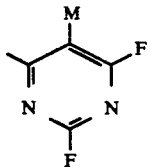
wherein
M=H, C$_1$–C$_4$-alkyl, C$_1$–C$_4$-thioalkyl, F or CF$_3$,
with the exception of the dyestuff of the formula
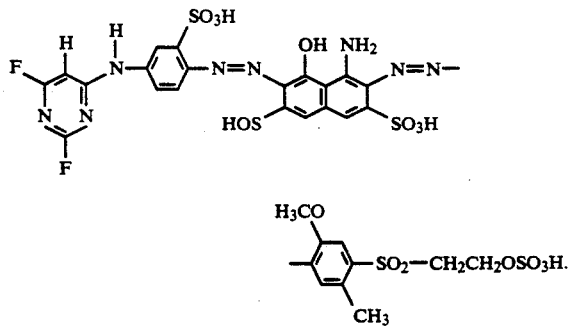
10 Claims, No Drawings

BIFUNCTIONAL REACTIVE DYESTUFFS CONTAINING VINYLSULPHONE OR ALKYLSULPHONE GROUPS AND A 2,4 DIFLUORO PYRIMIDINE GROUP

The present invention relates to metal-free dyestuffs of the formula

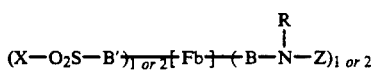  (1)

and metal complexes thereof wherein
- Fb = the radical of a dyestuff of the mono- or polyazo, anthraquinone, phthalocyanine, formazane, azomethine, dioxazine, phenazine, xanethene, thioxanthone, naphthoquinone, stilbene or triphenylmethane series,
- B and B' = a direct bond or bridge member to a ring C atom of an aromatic-carbocyclic ring or to a ring C or N atom of an aromatic-heterocyclic ring in Fb,
- X = CH=CH$_2$ or CH$_2$CH$_2$—Y, wherein
- Y = a radical which can be eliminated under alkaline conditions, for example OSO$_3$H, SSO$_3$H, OCOCH$_3$, OPO$_3$H$_2$, OSO$_2$CH$_3$, SCN, NHSO$_2$CH$_3$, Cl, Br, F, OCOC$_6$H$_5$, OSO$_2$—C$_6$H$_4$CH$_3$, [N(CH$_3$)$_3$]$^+$A$^-$ or

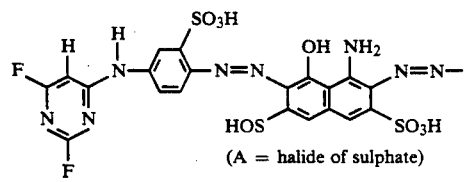

(A = halide of sulphate)

- R = H or C$_1$-C$_4$-alkyl, which can be optionally be substituted,
- Z = a fibre-reactive radical of the formula

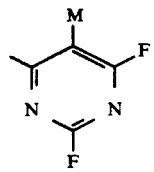  (2)

wherein

M = H, C$_1$-C$_4$-alkyl, C$_1$-C$_4$-thioalkyl, F or CF$_3$, with the exception of the dyestuff

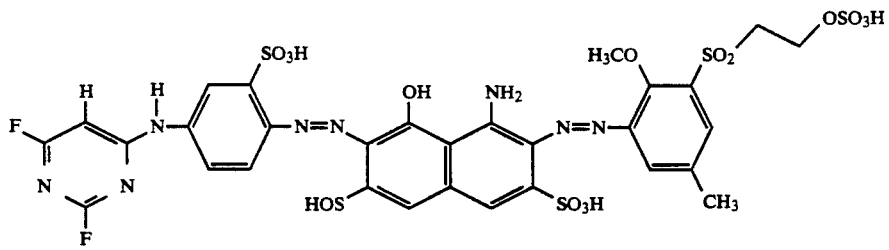

wherein is described in DE-A-3,318,146, Example 37.

Examples of the bridge members B are:

$-\overset{*}{\text{C}}\text{OCH}_2-$, $-\overset{*}{\text{C}}\text{H}_2-$, $-\overset{*}{\text{C}}\text{H}_2-\text{CH}_2-$, $-\overset{*}{\text{C}}\text{H}_2-\text{CH}_2-\text{CH}_2-$, $-\overset{*}{\text{S}}\text{O}_2-\text{CH}_2-\text{CH}_2-$, $-\overset{*}{\text{C}}\text{ONHCH}_2\text{CH}_2-$, $-\overset{*}{\text{S}}\text{O}_2\text{NH}-\text{CH}_2\text{CH}_2-$, $-\overset{*}{\text{N}}\text{H}-\text{CH}_2\text{CH}_2-$, $-\overset{*}{\text{O}}-\text{CH}_2\text{CH}_2-$,

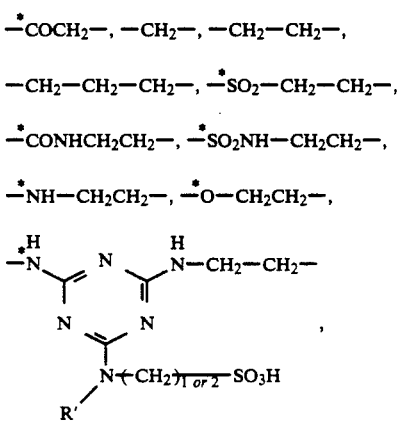

wherein R' = H or CH$_3$.
The radical

can also have, for example, the following meaning:

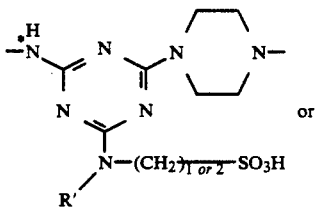

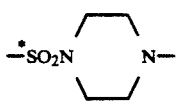

The asterisk in each case marks the linking point of the bridge member to the dyestuff radical Fb.
Examples of the bridge members B' are:

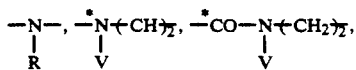

-continued

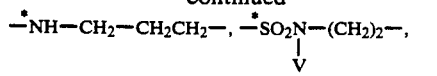

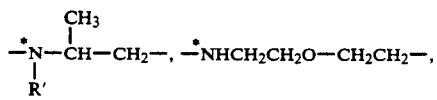

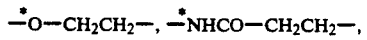

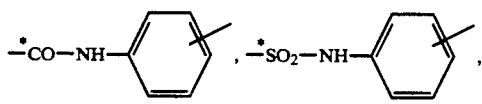

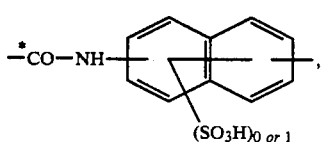

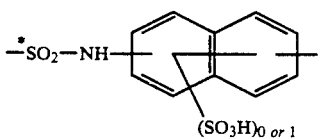

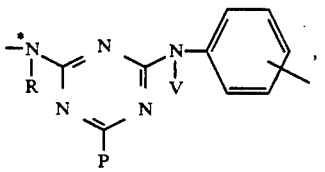

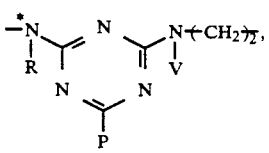

wherein
P=F, Cl or optionally substituted amino, preferably

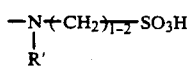

V=H, CH$_3$ or —CH$_2$CH$_2$SO$_2$—X,
R'=H or CH$_3$ and
R and X have the abovementioned meaning.

The bridge members B and B' can in each case have the same or a different meaning.

The radical Fb in formula (1) can be substituted in the customary manner. Examples which may be mentioned of other substituents on the radicals Fb are: alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, such as acetylamino, propionylamino or benzoylamino, the amino group, alkylamino groups having 1 to 4 carbon atoms, such as methylamino, ethylamino, propylamino, isopropylamino or butylamino, phenylamino, N,N-di-β-hydroxyethylamino, N,N-di-β-sulphatoethylamino, sulphobenzylamino, N,N-disulphobenzylamino, alkoxycarbonyl having 1 to 4 carbon atoms in the alkoxy radical, such as methoxycarbonyl or ethoxycarbonyl, alkylsulphonyl having 1 to 4 carbon atoms, such as methylsulphonyl or ethylsulphonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulphamoyl, N-alkylsulphamoyl having 1 to 4 carbon atoms, such as N-methylsulphamoyl, N-propylsulphamoyl, N-isopropylsulphamoyl or N-butylsulphamoyl, N-(4-hydroxyethyl)-sulphamoyl, N,N-di-(β-hydroxyethyl)-sulphamoyl, N-phenylsulphamoyl, ureido, hydroxyl, carboxyl, sulphomethyl or sulpho. The radicals Fb preferably contain one or more sulphonic acid groups.

Reactive dyestuffs of the formula (1) wherein Fb is the radical of an azo dyestuff contain as substituents above all methyl, ethyl, methoxy, ethoxy, acetylamino, benzoylamino, amino, chlorine, bromine, ureido, hydroxyl, carboxyl, sulphomethyl or sulpho.

If the radical R is an alkyl radical, it is straight-chain or branched; it can be further substituted, for example by halogen, hydroxyl, cyano, C$_1$–C$_4$-alkoxy, carboxyl, sulpho or sulphato. The following radicals may be mentioned as examples of R: methyl, ethyl, propyl, isopropyl, butyl, isobutyl, sec.-butyl, tert.-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulphomethyl, β-sulphoethyl, aminosulphonylmethyl and β-sulphatoethyl. R is preferably hydrogen, methyl or ethyl.

Preferred dyestuffs (1) are those in which B and B' represent a direct bond, and furthermore those in which —SO$_2$X represents —SO$_2$CH=CH$_2$ or —SO$_2$CH$_2$CH$_2$OSO$_3$H, and those in which Z represents

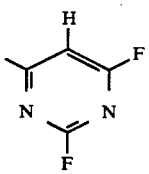 (2a)

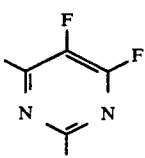 (2b)

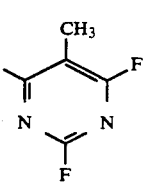 (2c)

-continued

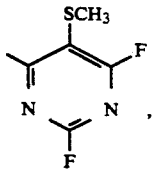 (2d)

and furthermore those which contain 1 to 6 groups which confer water-solubility, in particular sulpho groups.

Preferred dyestuffs (1) are monoazo and polyazo dyestuffs of the formula (1a) and metal complexes thereof

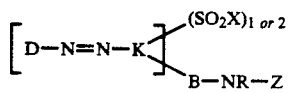 (1a)

wherein

D = the radical of a diazo component of the benzene or naphthalene series and

K = the radical of a coupling component of the benzene, napthalene, acetoacetic acid arylide or heterocyclic series; in the heterocyclic series, preferably a pyrazolone or pyridone radical.

The radicals D and K here can be substituted by further azo groups or by radicals containing azo groups, and also as mentioned above for the radical Fb of the formula (1).

Particularly preferred dyestuffs here are those of the formulae (1b) and (1c)

X—SO₂—D—N=N—K—B—NR—W  (1b)

W—NR—B—D—N=N—K'—SO₂—X  (1c)

wherein

X = —CH=CH₂ or CH₂CH₂OSO₃H,

W = a radical of the formulae 2a to 2d,

K'the radical of a coupling component from the pyrazolone, pyridone or acetoacetic acid arylide series and D, K, R and B have the meaning already mentioned above.

Examples of D are, preferably, phenyl or phenylene which is optionally substituted by SO₃H, chlorine, C₁-C₄-alkoxy, C₁-C₄-alkyl, carbalkoxy or sulphonamido, naphthyl or naphthylene which is optionally substituted by SO₃H, chlorine, C₁-C₄-alkoxy or C₁-C₄-alkyl, 4-(phenylazo)phenyl which is optionally substituted by SO₃H and biphenylene which is optionally substituted by SO₃H.

K represents, for example, the radical of a coupling component from the hydroxybenzene, hydroxynaphthalene, aminobenzene, aminonaphthalene or aminohydroxynaphthalene series, or represents a 5-hydroxy-3-methyl(or carboxy)-pyrazolone radical, a 6-hydroxy-2-pyridone radical or an acetoacetic acid arylide radical which is optionally ring-substituted by C₁-C₄-alkyl or C₁-C₄-alkoxy. The last three radicals mentioned are also suitable examples of K'. K and K' can contain the customary substituents, in particular sulphonic acid groups.

The dyestuffs of the following formulae (3) to (35) are preferred:

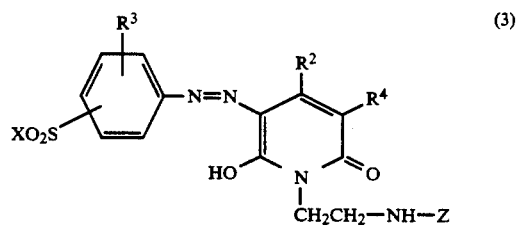 (3)

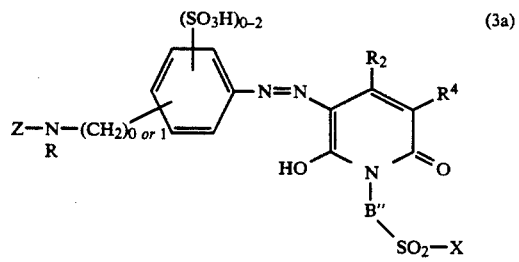 (3a)

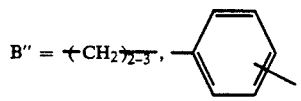

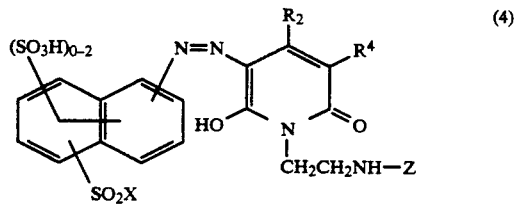 (4)

wherein

R₂ = H, C₁-C₄-alkyl, in particular CH₃, CH₂SO₃H or COOH,

R₃ = H, C₁-C₄-alkyl, C₁-C₄-alkoxy, Cl, Br, COOH or SO₃H and

R₄ = H, SO₃H, CH₂SO₃H, Cl, C₁-C₄-alkylsulphonyl, carboxamide, in particular CONH₂, or carboxylic acid mono- or di-C₁-C₄-alkylamide.

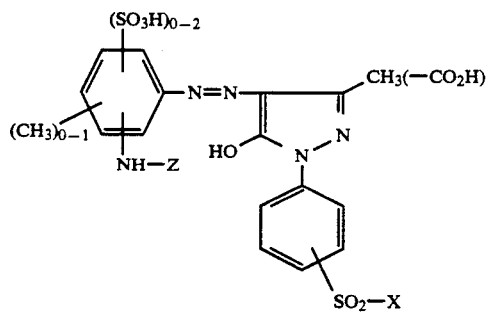 (5)
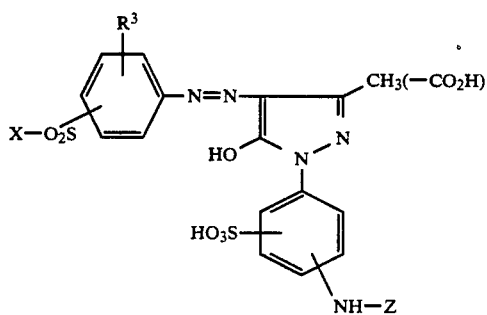 (6)
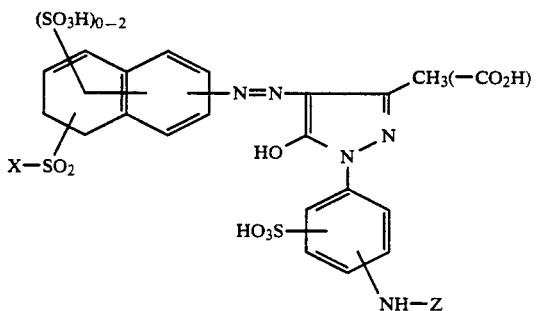 (7)
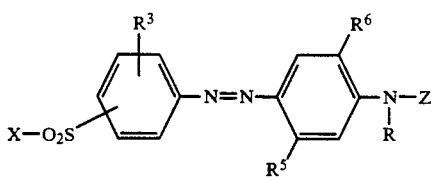 (8)
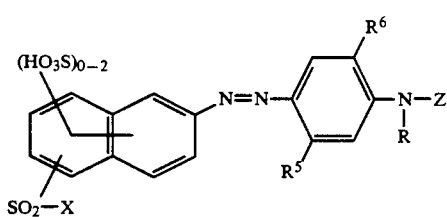 (9)
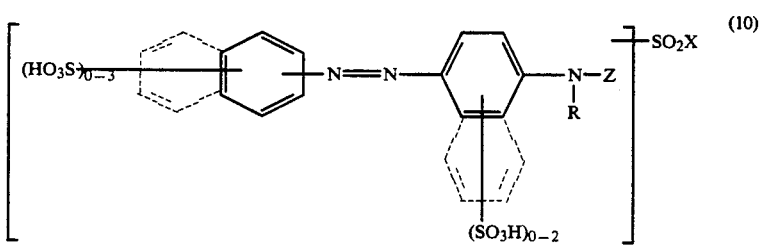 (10)
wherein
$R^5$ = H, $C_1$–$C_4$-alkyl, $C_1$–$C_4$-alkoxy, acylamino, in particular $C_1$–$C_4$-alkylcarbonylamino or arylcarbonylamino, such as optionally substituted phenylcarbonylamino, $C_1$–$C_4$-alkylsulphonylamino, Cl, Br, aminocarbonylamino, $C_1$-$C_4$-alkylsulphonylamino or arylsulphonylamino and
$R^6$=H, $C_1$-$C_4$-alkyl, $C_1$-$C_4$-alkoxy, OH or $SO_3H$
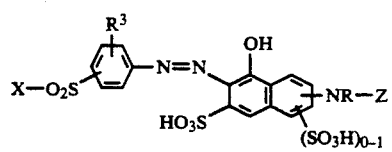 (11)
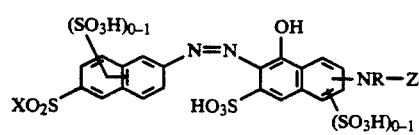 (12a)
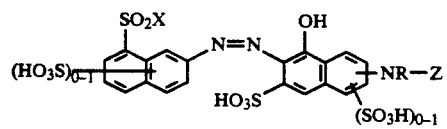 (12b)
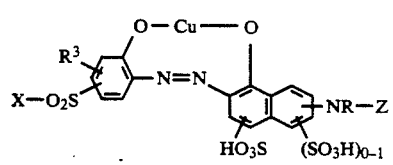 (13)
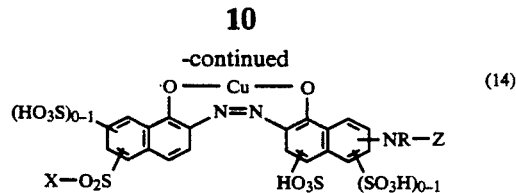 (14)
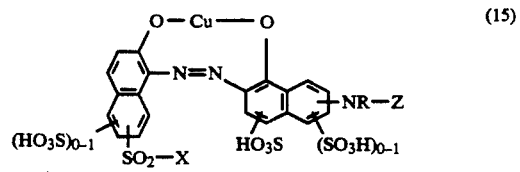 (15)
1:2 metal complexes of the dyestuffs 16
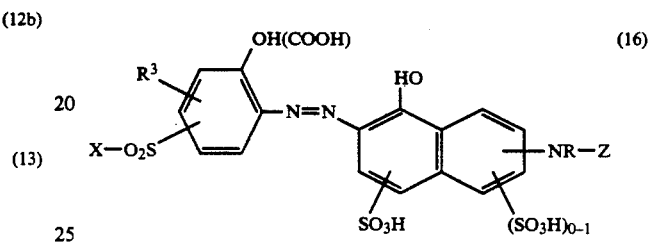 (16)
in particular the Cr and Co complexes which contain two dyestuffs (16) or one dyestuffs (16) and any other desired dyestuff which forms metal complexes, in particular an azo or azomethine dyestuff.
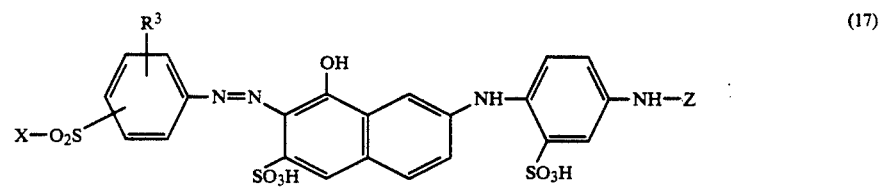 (17)
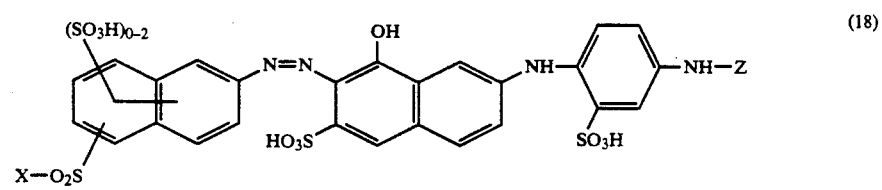 (18)
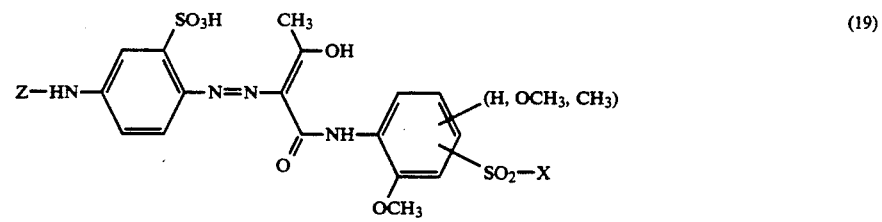 (19)
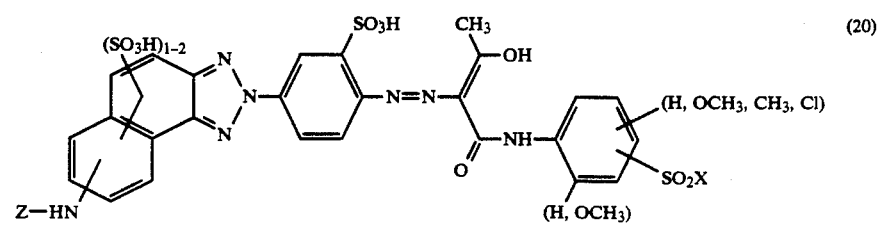 (20)

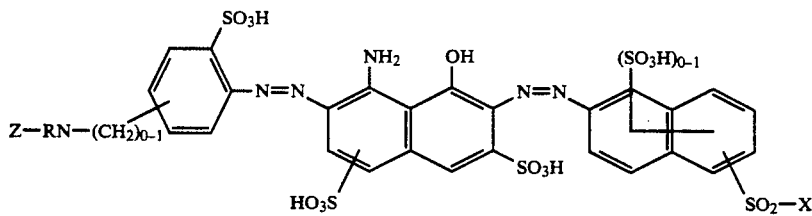 (21)
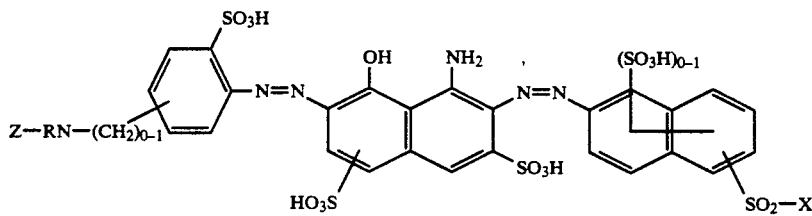 (22)
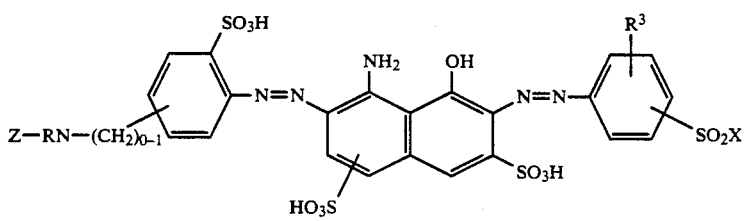 (23)
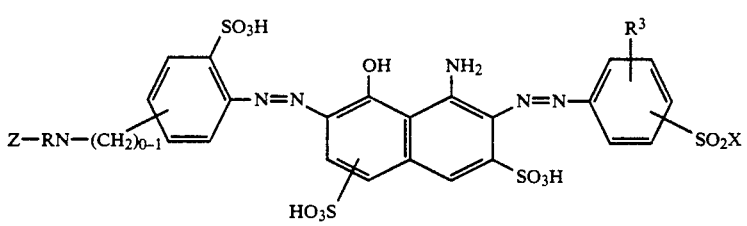 (24)
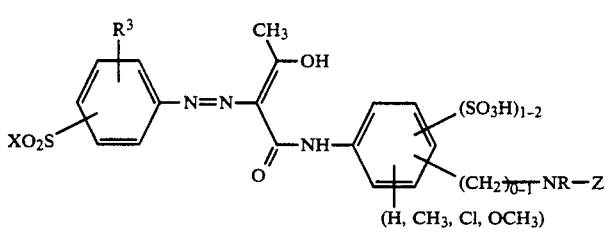 (25)
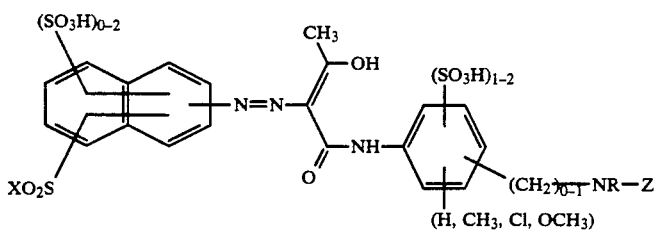 (26)
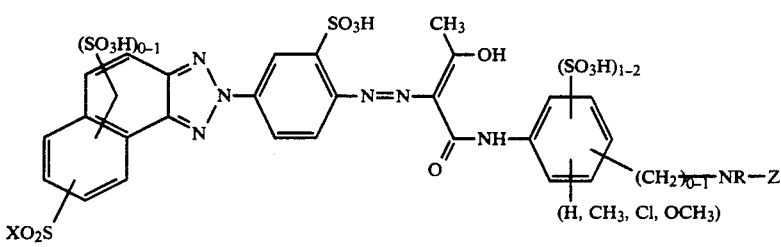 (27)

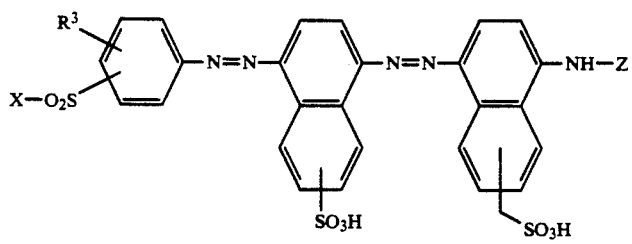
(28)
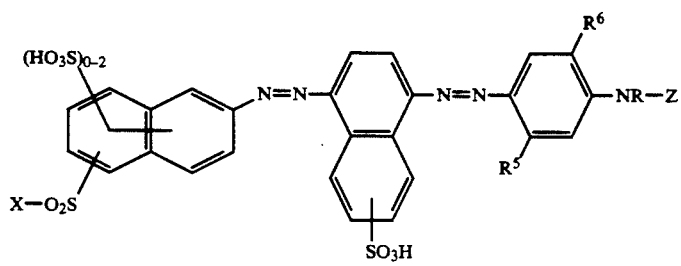
(29)
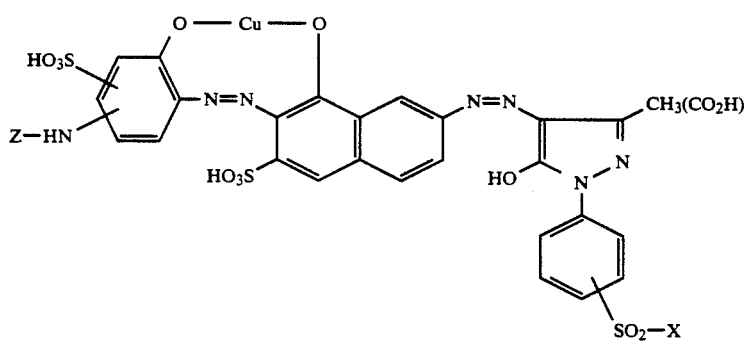
(30)
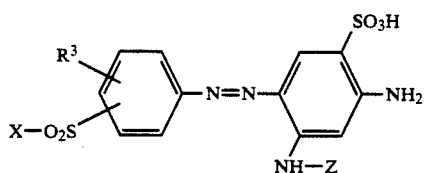
(31)
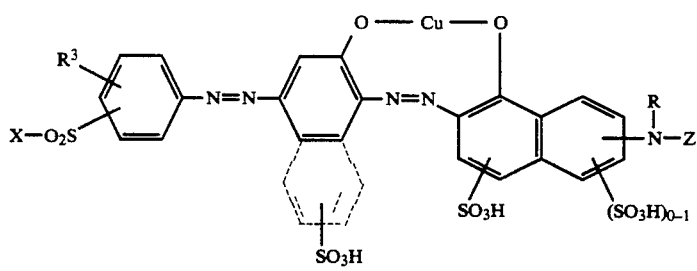
(32)
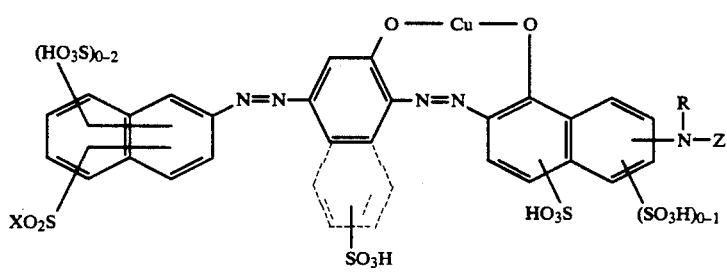
(33)

-continued
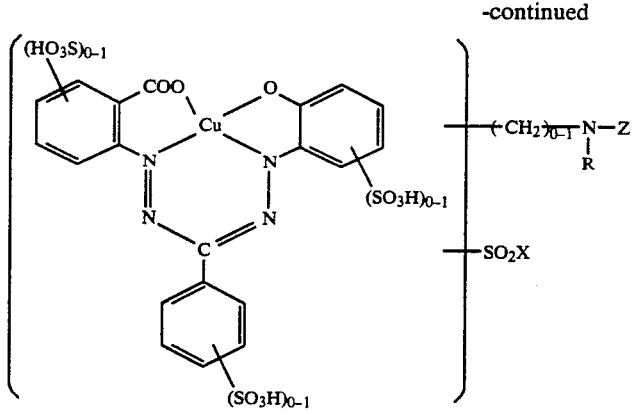
(34)
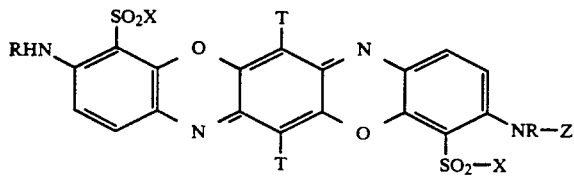
(35)
wherein T=Cl, Br or OCH₃.
Particularly preferred dyestuffs (1) are those where X=CH$_2$CH$_2$OSO$_3$H or CH=CH$_2$ and 2a, 2b, 2c or 2d,
W = a radical of the formula 2a, 2b, 2c or 2d,
and amongst these in particular those having 1–6 groups which confer water-solubility, preferably sulpho groups, in particular the following:
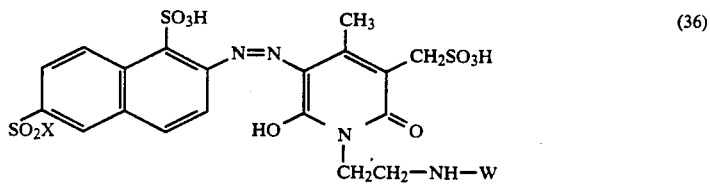
(36)
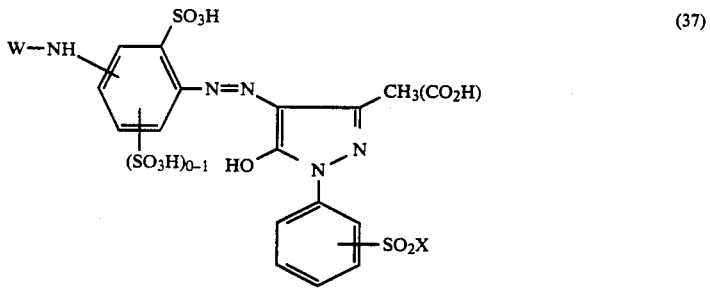
(37)
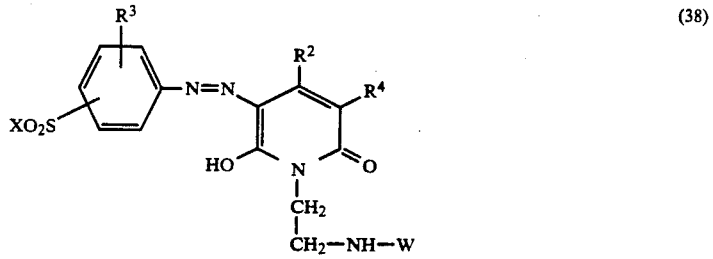
(38)
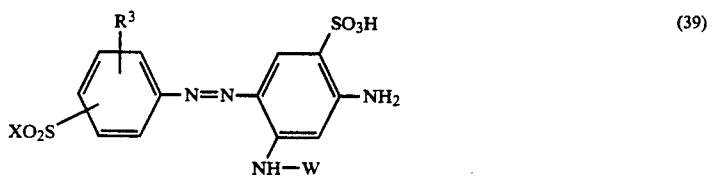
(39)

-continued
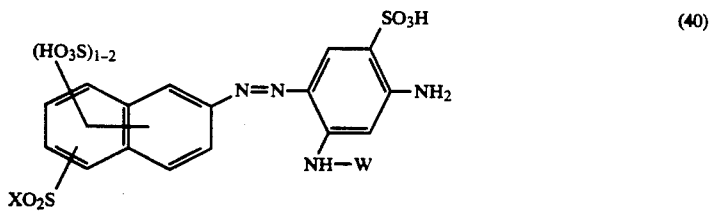 (40)
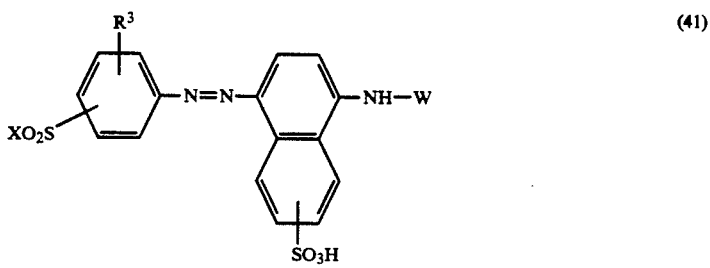 (41)
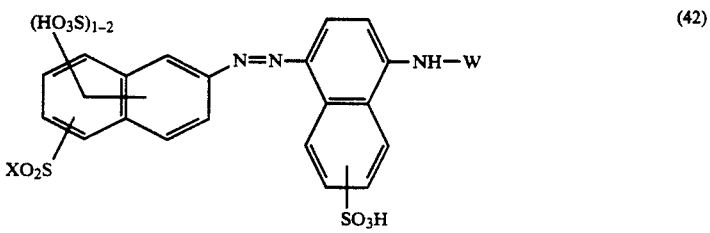 (42)
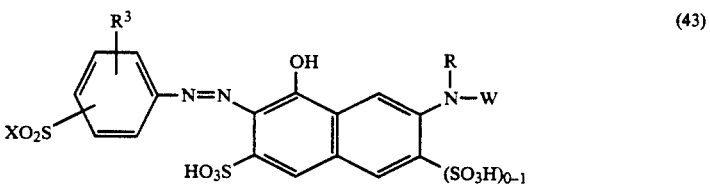 (43)
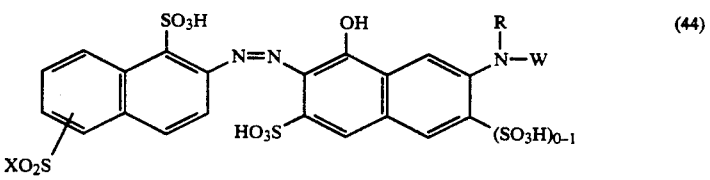 (44)
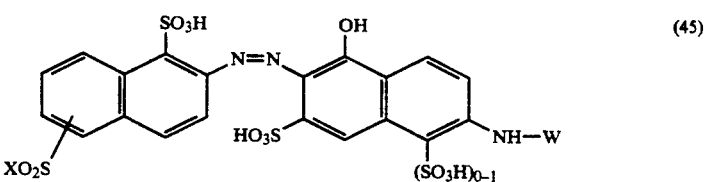 (45)
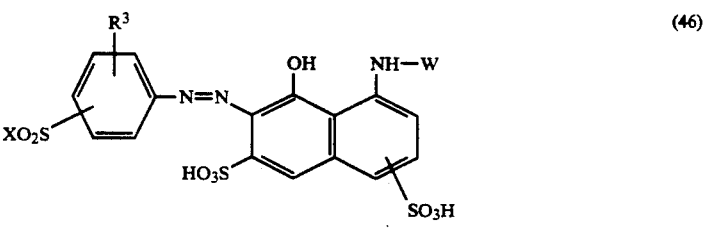 (46)

-continued
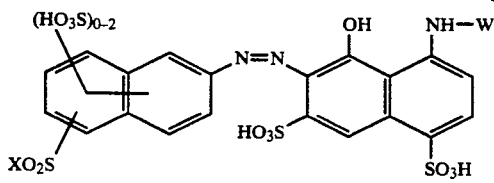 (47)
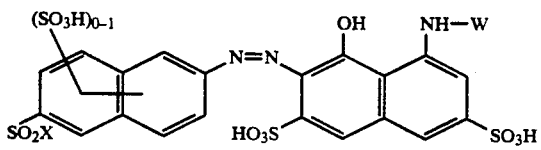 (48)
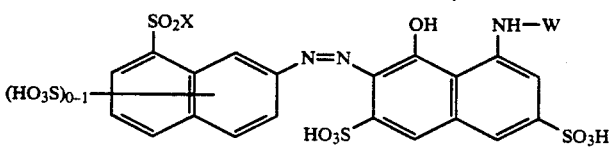 (49)
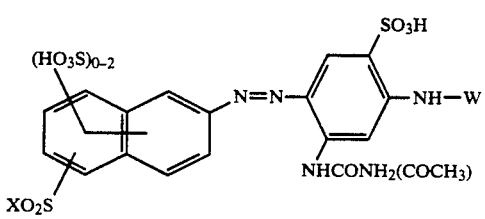 (50)
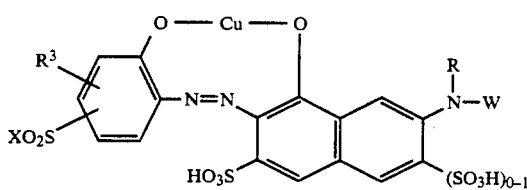 (51)
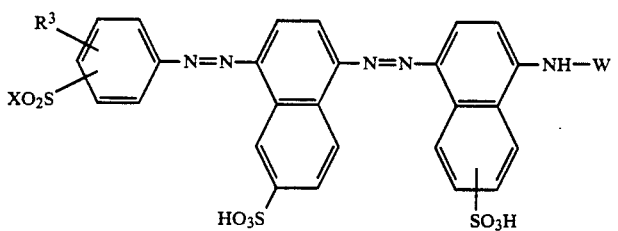 (52)
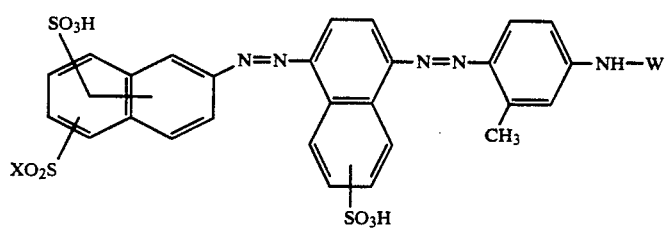 (53)
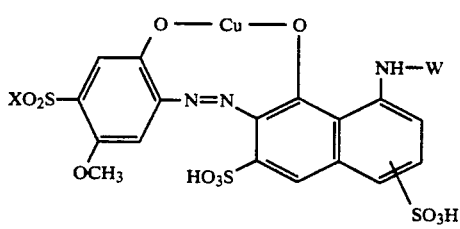 (54)

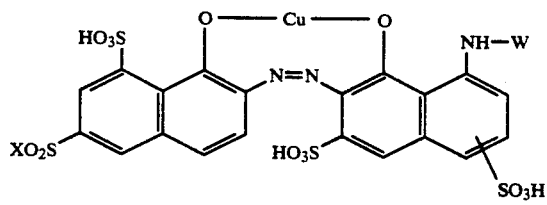
(55)

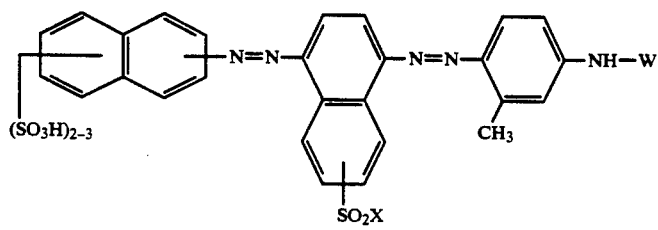
(56)

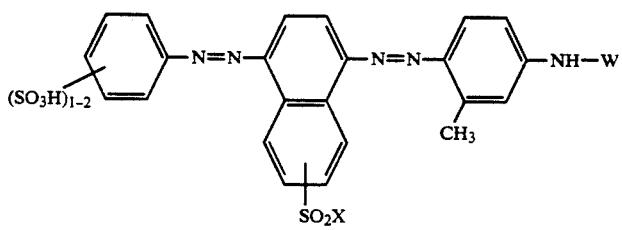
(57)

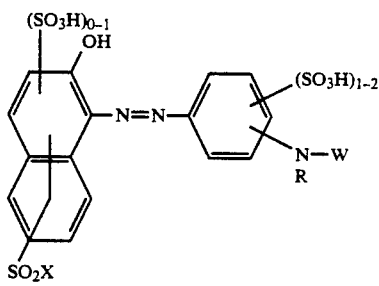
(58)

Preferred dyestuffs are furthermore those in which Fb represents a dyestuff radical from the phthalocyanine, formazane and in particular triphendioxazine series.

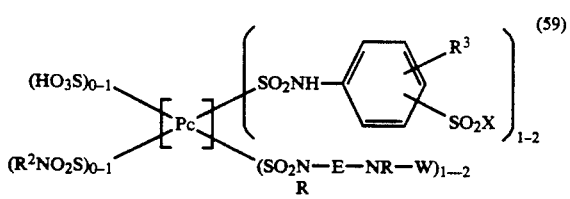
(59)

wherein Pc represents a Cu phthalocyanine or Ni phthalocyanine radical and the total number of substituents on the Pc structure is not more than 4; E=an aliphatic bridge member, in particular $C_2$-$C_4$-alkylene, and R has the abovementioned meaning.

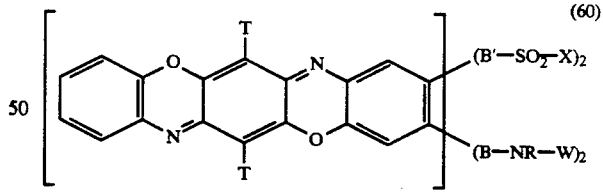
(60)

preferably

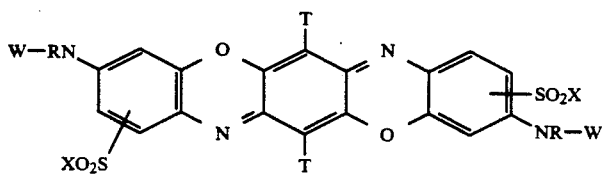
(61)

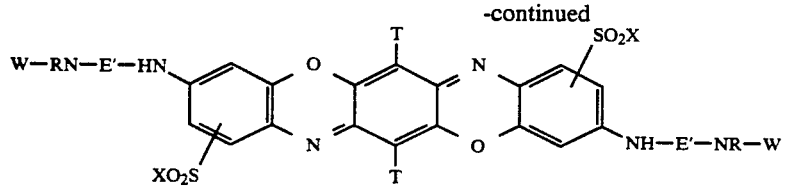

wherein E′=an aliphatic or aromatic bridge member, in particular optionally substituted $C_2$–$C_4$-alkylene or optionally substituted phenylene, and T, R, B, B′, W and X have the abovementioned meaning.

The new dyestuffs can be obtained by the most diverse preparation processes customary in dyestuff chemistry. The following may be mentioned as examples:

1) Dyestuffs of the formula

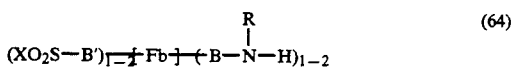

are reacted with 1 or 2 mol of a reactive component

Z—F in a manner which is known per se, H—F being split off.

2) Dyestuffs of the formula (1) where the radical —$SO_2X$ = $SO_2CH_2CH_2OH$ are sulphated in a known manner to give the dyestuffs of the formula (1) where the radical —$SO_2X$ = $SO_2CH_2CH_2OSO_3H$.

3) Precursors of Fb containing 1 to 2 radicals —$SO_2X$ or 1 to 2 radicals

are reacted with one another, for example by condensation or, as in the case of diazo or coupling components, by coupling, and the products are then metallized, if appropriate.

Such precursors are, for example, known diazo components, coupling components, 1-amino-4-bromoanthraquinone-2-sulphonic acid compounds, aromatic or aliphatic primary or secondary amines, phthalocyanine sulphochlorides, aminophenol compounds and aminobenzoic acid compounds. A large number of such starting compounds and their modes of reaction are described in the literature on the preparation of known dyestuffs.

As diazo components which contain 1 or 2 —$SO_2X$ groups there may be mentioned:

aniline-4-β-sulphatoethyl-sulphone, aniline-4-β-thiosulphatoethyl-sulphone, aniline-4-vinyl-sulphone, aniline-4-β-chloroethyl-sulphone, aniline-3-β-sulphatoethyl-sulphone, aniline-3-vinyl-sulphone, 2-methoxyaniline-5-β-sulphatoethyl-sulphone, 2-methoxy-aniline-5-β-thiosulphatoethyl-sulphone, 2-methoxy-aniline-5-vinylsulphone, 4-methoxy-aniline-3-β-sulphatoethyl-sulphone, 4-methoxy-aniline-3-β-vinyl-sulphone, 2,5-dimethoxyaniline-4-β-sulphatoethyl-sulphone, 2,5-dimethoxyaniline-4-vinyl-sulphone, 2,5-dimethoxy-aniline-4-β-sulphatoethyl-sulphone, 2-methoxy-5-methyl-aniline-4-β-sulphatoethyl-sulphone, aniline-2-β-sulphatoethylsulphone, 2-chloroaniline-5-β-sulphatoethyl-sulphone, 4-chloroaniline-3-β-sulphatoethyl-sulphone, 3-(3- or 4-aminobenzoyl)-aminophenyl-β-sulphatoethyl-sulphone, 2-methoxy-5-methyl-aniline-4-vinyl-sulphone, 6-carboxyaniline-3-β-sulphatoethyl-sulphone, 6-carboxy-aniline-3-vinyl-sulphone, 2-sulphoaniline-4-β-sulphatoethylsulphone, 2-sulphoaniline-4-vinyl-sulphone, 2,4-disulphoaniline-5-vinyl-sulphone, 2-hydroxyaniline-5-β-sulphatoethyl-sulphone, 2-hydroxy-aniline-4-β-sulphatoethylsulphone, 3-sulpho-2-hydroxyaniline-5-β-sulphatoethylsulphone, 2-naphthylamine-8-β-sulphatoethyl-sulphone, 2-naphthylamine-6-β-sulphatoethyl-sulphone, 1-sulpho-2-naphthylamine-6-β-sulphatoethyl-sulphone, 1-naphthylamine-4-β-sulphatoethyl-sulphone, 1-sulpho-2-naphthylamine-5-β-sulphatoethyl-sulphone, 6-sulpho-2-naphthylamine-8-β-sulphatoethyl-sulphone, 2-amino-3-sulphonaphthalene-6,8-bis-(β-sulphatoethyl-sulphone), 2-bromo-1-aminobenzene-4-β-sulphatoethyl-sulphone, 2,6-dichloro-1-aminobenzene-4-β-sulphatoethyl-sulphone, 1-naphthylamine-5-β-sulphatoethyl-sulphone, 2-naphthylamine-5-β-sulphatoethyl-sulphone, 2-naphthylamine-8-β-sulphatoethyl-sulphone and 8-sulpho-2-naphthylamine-6-β-sulphatoethyl-sulphone.

Examples of suitable diazo components with the radical

 are

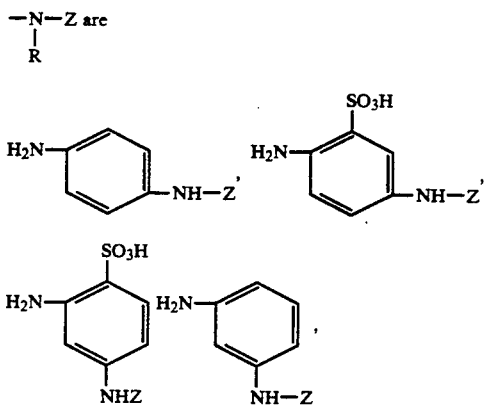

-continued

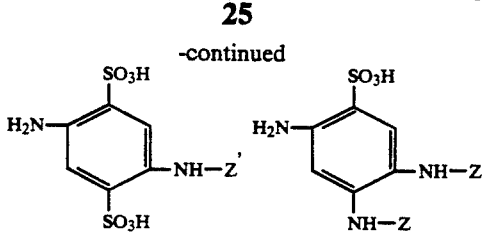

Aromatic monoamines and diamines which can be used both as diazo components and as coupling components in the preparation of disazo compounds according to the invention are: aniline, 3-methylaniline, 3-chloroaniline, 2,5-dimethylaniline, 2,5-dimethoxyaniline, 3-methoxyaniline, 3-methyl-6-methoxyaniline, 3-aminophenylurea, 3-acetylamino-6-methylaniline, 2-amino-4-acetylaminobenzene-1-sulphonic acid, 1-naphthylamine-6-$\beta$-sulphatoethylsulphone, 1-naphthylamine-7-$\beta$-sulphatoethyl-sulfone, 1,3-diaminobenzene, 1,3-diamino-4-methyl- or -methoxybenzene, 1,3-diaminobenzene-4-sulphonic acid, 1-aminonaphthalene, 1-aminonaphthalene-6- or -7-sulphonic acid, 3-acetylamino-aniline, 2-amino-8-naphthol-6-sulphonic acid, 2-amino-8-naphthol-4,6-disulphonic acid, 2-amino-5-naphthol-7-sulphonic acid, 3-amino-5-naphthol-7-sulphonic acid, 1-amino-5-naphthol-7-sulphonic acid, 1-N-acetoacetylamino-4-aminobenzene, 1-N-acetoacetylamino-3-methyl-4-aminobenzene, 1-N-acetoacetylamino-3-methoxy-4-aminobenzene, 4-amino-3-sulphatoacetylacetanilide, (1-3'-aminophenyl)-3-methyl-pyrazol-5-one, 1-(4'-aminophenyl)-3-methyl-pyrazol-5-one, 1-(3'- or -4'-aminophenyl)-3-carboxy-pyrazol-5-one, 1-(3'-sulpho-4'-aminophenyl)-3-carboethoxy-pyrazol-5-one, 1-(3'-amino-4'-sulphophenyl)-3-carboxy-pyrazol-5-one, 1-(2',4',6'-trimethyl-3'-amino-5'-sulphophenyl)-3-carboethoxypyrazol-5-one, 1-(4'-aminophenyl)-3-methyl-pyrazol-5-one, 1-(3'-amino-6'-methyl-phenyl)-3-carboxy-pyrazol-5-one.

Examples of aromatic diamines which can be used as tetrazo components for the preparation of disazo compounds according to the invention are: 1,3-diaminobenzene, 1,3-diaminobenzene-4-sulphonic acid, 1,4-diaminobenzene, 1,4-diaminobenzene-2-sulphonic acid, 1,4-diamino-2-methyl-benzene, 1,4-diamino-2-methoxybenzene, 1,3-diamino-4-methyl-benzene, 1,3-diaminobenzene-5-sulphonic acid, 1,3-diamino-5-methyl-benzene, 1,6-diamino-naphthalene-4-sulphonic acid, 2,5-diamino-4,8-disulpho-naphthalene, 3,3'-diamino-diphenyl-sulphone, 4,4'-diamino-diphenyl-sulphone, 3,3'-diamino-diphenylsulphone-disulphonic acid, 4,4'-diamino-stilbene-2,2'-disulphonic acid, 4,4'-diamino-diphenyl-sulphone, 2,7-diamino-diphenylene-sulphone-4,5-disulphonic acid, 4,4'-diamino-benzophenone, 4,4'-diamino-3,3'-dinitro-benzophenone, 3,3'-diamino-4,4'-dichloro-benzophenone, 4,4'- or 3,3'-diamino-diphenyl, 4,4'-diamino-3,3'-dichlorodiphenyl, 4,4'-diamino-3,3'-dimethoxy- or -3,3'-dimethyl- or -2,2'-dimethyl- or -2,2'-dichloro- or -3,3'-diethoxydiphenyl, 4,4'-diamino-3,3'-dimethyl-6,6'-dinitrodiphenyl, 4,4'-diamino-2,2'- or 3,3'-disulpho-diphenyl, 4,4'-diamino-3,3'-dimethyl- or -3,3'-dimethoxy- or 2,2'-dimethoxy-6,6'-disulpho-diphenyl, 4,4'-diamino-2,2',5,5'-tetrachloro-diphenyl, 4,4'-diamino-3,3'-dinitro-diphenyl, 4,4'-diamino-2,2'-dichloro-5,5'-dimethoxy-diphenyl, 4,4'-diamino-2,2'- or -3,3'-dicarboxylic acid, 4,4'-diamino-3,3'-dimethyl-diphenyl-5,5'-disulphonic acid, 4,4'-diamino-2-nitro-diphenyl, 4,4'-diamino-3-ethoxy- or -3-sulpho-diphenyl, 4,4'-diamino-3,3'-dimethyl-5-sulphodiphenyl, 4,4'-diamino-diphenylmethane, 4,4'-diamino-3,3'-dimethyl-diphenylmethane, 4,4'-diamino-2,2',3,3'-tetramethyl-diphenylmethane, 4,4'-diamino-diphenylethane, 4,4'-diaminostilbene, 4,4'-diamino-diphenylmethane-3,3'-dicarboxylic acid and 1,2-di-(4'-amino-phenoxy)-ethane.

Examples of coupling components which can be contained in or used for the preparation of the mono- or disazo dyestuffs according to the invention are, in particular, the compounds of the formulae:

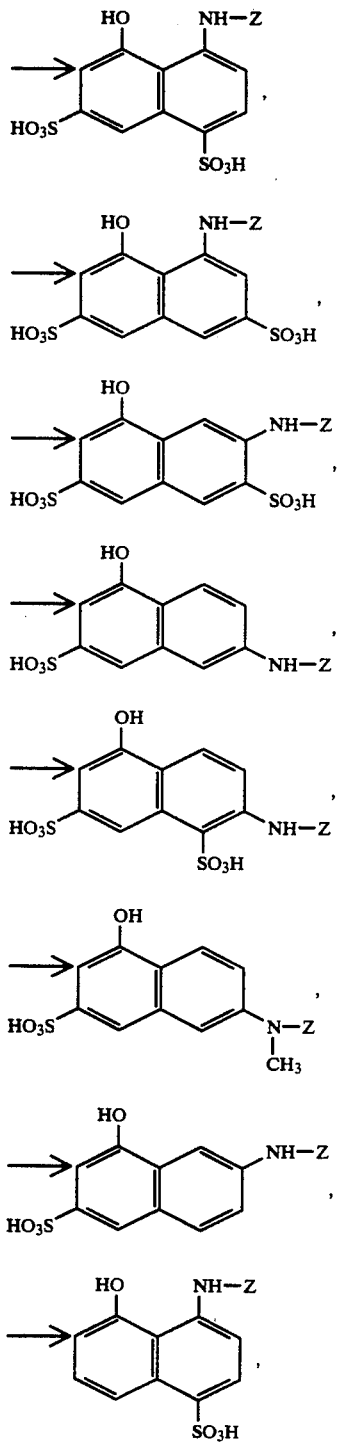

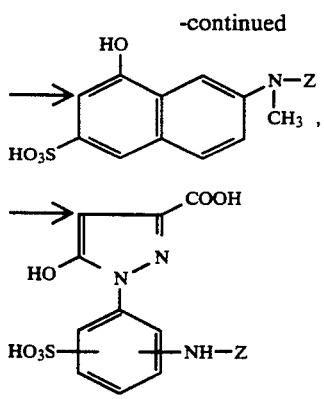

To prepare the mono- or disazo compounds according to the invention and also metal complex dyestuffs thereof, the customary procedure can be followed, for example by carrying out the reaction of the diazotised aromatic amines with the coupling components analogously to known diazotisation and coupling methods and if desired converting these azo compounds, such as the copper, cobalt or chromium complex compounds, by subsequent metallisation analogously to known procedures (see Houben-Weyl, "Methoden der Organischen Chemie" (Methods of Organic Chemistry), 4th edition (1965), Volume 10/3, page 452 et seq.; Angewandte Chemie 70, 232–238 (1958); and angewandte Chemie 64, 397 (1952)).

However, a procedure can also be followed, for example, in which an aromatic amine which contains, for example, the group of the formula —SO₂X mono- or divalently bonded, is diazotised and the diazotisation product is coupled to a coupling component which still as a free acylatable amino group. The azo compound thus prepared can then be reacted with a compound Z-Hal in a known manner.

Other conversion reactions of the dyestuffs or precursors thereof, such as metallisation reactions, sulphations, triazolisations or introduction of acylamino or triazinyl groupings, can in general be carried out in any desired stages of the dyestuffs synthesis. Details can be found in the examples described below.

The formulae shown are those of the free acids. The salts, in particular the alkali metal salts, such as sodium, potassium or lithium salts, are in general obtained in the preparation. However, the dyestuffs can also be employed as concentrated solutions.

The dyestuffs according to the invention are outstandingly suitable for dyeing and printing naturally occurring and synthetic materials containing OH groups or amide groups, in particular those of cellulose and polyamides. They are particularly suitable for dyeing cellulose materials by the exhaust and cold pad-batch processes and for printing cellulose materials, such as cotton or viscose staple.

Dyeings with good general fastness properties, in particular wet fastness properties, are obtained with a good build-up capacity and high fixing yields.

EXAMPLE 1

0.1 mol of H acid are dissolved in 350 ml of water under alkaline conditions, the pH is brought to 4 with hydrochloric acid and acylation is carried out with 0.105 mol of 2,4,6-trifuloropyrimidine at 40° C., the pH being kept at 4 with sodium carbonate. When the condensation reaction has ended, the reaction product is in solution and is clarified. 0.095 mol of 2-amino-6-sulphatoethylsulphonylnaphthalene-1-sulphonic acid are dissolved in 300 ml of water and diazotised with sodium nitrite solution in the presence of hydrochloric acid. After excess nitrite has been removed with amidosulphonic acid, the diazotisation product is added to the coupling component and a pH of 6.5 to 7 is established and maintained with sodium carbonate solution. When the coupling has ended, the dyestuff is salted out, isolated, dried and ground. The dyestuff thus obtained, of the formula

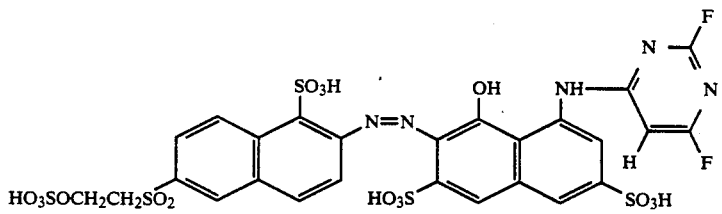

dyes cotton in bluish-tinged red shades.

EXAMPLE 2

0.095 mol of 1-amino-4-sulphatoethylsulphonylbenzene are stirred in water and diazotised with sodium nitrite solution. The mixture is subsequently stirred for 30 minutes and excess nitrite is then removed with amidosulphonic acid. The diazotisation product is added to the coupling component prepared in Example 1 and the pH is brought to 6 to 7 with sodium carbonate solution. When the coupling has ended, the dyestuff is salted out, isolated, dried and ground.

The dyestuff of the formula

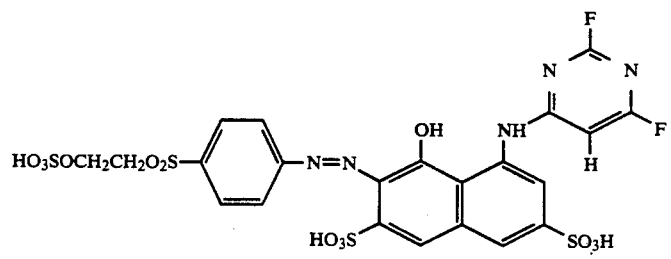

dyes cotton in clear red shades.

EXAMPLE 3

If the procedure is according to Example 1 and the H acid is replaced by K acid, the dyestuff of the formula

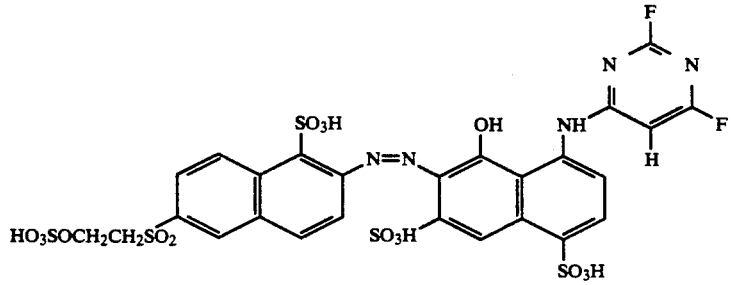

with which cotton is printed in clear red shades, is obtained.

EXAMPLE 4

If the procedure is according to Example 2 and the H acid is replaced by K acid, the dyestuff of the formula

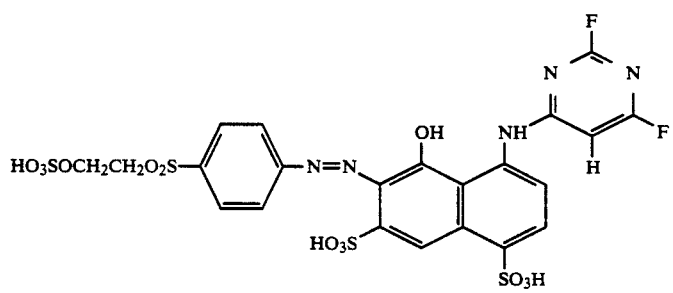

with which cotton can be dyed or printed in clear yellowish-tinged red shades, is obtained.

Similarly useful dyestuffs are obtained if the reactive component 2,4,6-trifluoropyrimidine in Examples 1 to 4 is replaced by 5-methyl-2,4,6-trifluoropyrimidine, 5-thiomethyl-2,4,6-trifluoropyrimidine, 5-trifluoromethyl-2,4,6-trifluoropyrimidine or 2,4,5,6-tetrafluoropyrimidine.

EXAMPLE 5

281 parts of 4-β-sulphatoethylsulphonyl-aniline are introduced into 1,000 parts of water and dissolved by careful addition of 65 parts of sodium carbonate, a pH of 6.5 to 7.0 being established. Stirring is continued at this pH for 2 hours, and 750 parts of ice and 255 parts of 31% strength aqueous hydrochloric acid are added; 173 parts of 40% strength aqueous sodium nitrite solution are then allowed to run in, the mixture is subsequently stirred at 0 to 5° C. for a further 2 hours and excess nitrous acid is then destroyed by means of amidosulphonic acid. A solution of the condensation product of in each case one mole of cyanuric chloride, 1-amino-8-naphthol-3,6-disulphonic acid, 3-amino-acetanilide-4-sulphonic acid and 2,4,6-trifluoropyrimidine is then allowed to run into the diazonium salt suspension thus prepared, while simultaneously introducing about 70 parts of sodium carbonate, at a pH of 6.0 to 6.5. This solution of the condensation product is prepared as follows: 319 parts of 1-amino-8-naphthol-3,6-disulphonic acid are introduced into a mixture of 500 parts of water and 121 parts of a 33% strength sodium hydroxide solution, while stirring; the pH of the solution should then be 6.5 to 7.0. This solution is allowed to run into a suspension of 194 parts of cyanuric chloride, 800 parts of water and 800 parts of ice at a pH of 3.0 to 3.8 in the course of one hour. The mixture is stirred at 0 to 5° C. for a further hour at the pH stated, which is maintained by sprinkling in 92 parts of sodium bicarbonate. 221 parts of 3-aminoacetanilide-4-sulphonic acid are introduced into the clear solution thus obtained, and 105 parts of sodium carbonate are then introduced in the course of one hour, the pH increasing to 4.5 to 5.0. The mixture is subsequently stirred at this pH for a further 2 hours, the temperature being kept at 35 to 40° C. 400 parts of concentrated sodium hydroxide are added to the solution and the mixture is stirred at 70 to 75° C. for 2 hours. It is then neutralised with concentrated hydrochloric acid. The equivalent amount of 2,4,6-trifluoropyrimidine is added to this neutral solution and the mixture is heated to 30° C.

After the diazonium suspension and the solution of the coupling component have been combined, the coupling mixture is subsequently stirred at room temperature for a further 2 hours, a pH of 6.0 to 6.5 being maintained by sprinkling in 70 parts of sodium carbonate in portions. When the coupling has ended, the mixture is heated to 50° C., 40 parts of kieselguhr are added, the solution is clarified (filtered) and the filtrate is spray-dried.

A red electrolyte-containing powder which contains the dyestuff of the formula

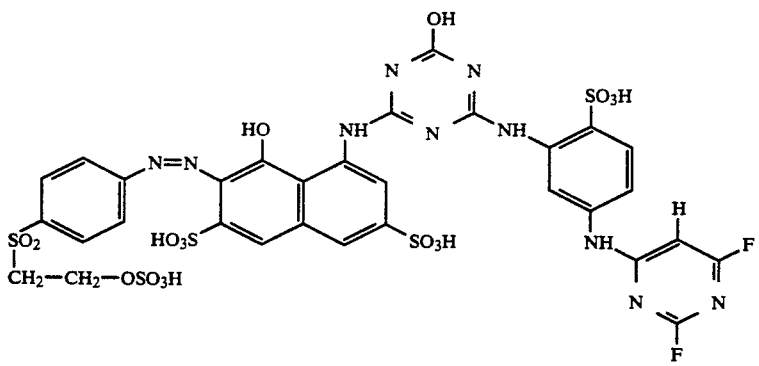

is obtained.

This dyestuff dyes wool from an acid bath or cellulose fibre materials in the presence of acid-binding agents by the application and fixing methods customary in industry for fibre-reactive dyestuffs in clear red shades with a very good colour build-up and a high degree of fixing. The dyeings have very good wet-fastness properties.

EXAMPLE 6

64 parts of 1-amino-8-naphthol-3,6-disulphonic acid are dissolved in 800 parts of water at pH 4.5 to 5.0, with the addition of 15 parts of sodium carbonate. The solution is then cooled to 0° C. and 28 parts of cyanuric fluoride are added dropwise, during which the pH falls and is maintained at pH 3 to 4 by sprinkling in sodium bicarbonate powder. The mixture is subsequently stirred at pH to 4 and 0° C. for 15 minutes, and a solution of the condensation product of 2,4-diaminobenzenesulphonic acid and 2,4,6-trifluoropyrimidine is then added. The mixture is stirred at 20 to 25° C. at a pH of 5 for 5 hours, until free amine can no longer be detected by a diazotisation sample.

To prepare the diazonium compound, 56 parts of aniline-4-β-sulphatoethyl-sulphone are suspended in 500 parts of ice-water, the suspension is acidified with 45 parts of concentrated aqueous hydrochloric acid and diazotisation is carried out with 40 parts by volume of 5N sodium nitrite solution. The mixture is subsequently stirred at about 5° C. for 2 hours and excess nitrous acid is then destroyed by means of amidosulphonic acid. The diazonium salt solution thus prepared is allowed to run slowly into the solution of the coupling component at a pH of 5.5 to 6.0. The mixture is subsequently stirred for 2 hours, until coupling is complete. The pH is kept at 5.5 to 6.0 by addition of sodium bicarbonate. The dyestuff is then precipitated with sodium chloride, isolated on a suction filter and dried in vacuo at 40° C. After grinding, a red electrolyte-containing dyestuff powder is obtained, which contains the sodium salt of the dyestuff of the formula

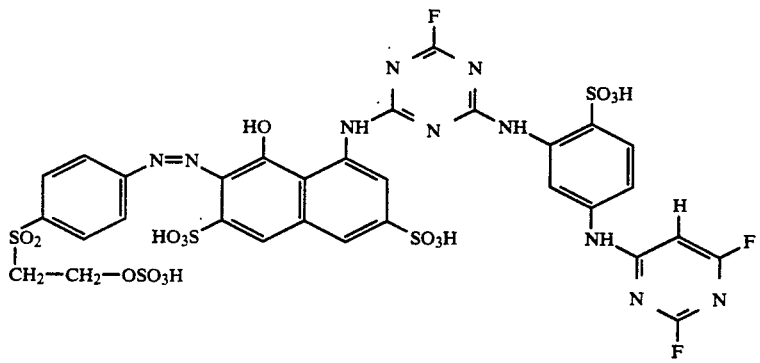

The dyestuff dyes cotton and wool by the customary dyeing and printing methods for reactive dyestuffs in red shades with very good wet-fastness properties.

The dyestuffs listed in the following table, which dye cotton in the colour shade shown, can also be prepared by methods analogous to those described.

| No. | Example | Colour shade |
|---|---|---|
| 7 | ![structure] | bluish-tinged red |

-continued

| No. | Example | Colour shade |
|---|---|---|
| 8 | (structure) | bluish-tinged red |
| 9 | (structure) | bluish-tinged red |
| 10 | (structure) | yellowish-tinged red |
| 11 | (structure) | yellowish-tinged red |
| 12 | (structure) | red |
| 13 | (structure) | bluish-tinged red |

-continued

| No. | Example | Colour shade |
|---|---|---|
| 14 | (structure) | bluish-tinged red |
| 15 | (structure) | yellowish-tinged red |
| 16 | (structure) | bluish-tinged red |
| 17 | (structure) | bluish-tinged red |
| 18 | (structure) | red |
| 19 | (structure) | yellowish-tinged red |

-continued

| No. | Example | Colour shade |
|---|---|---|
| 20 | 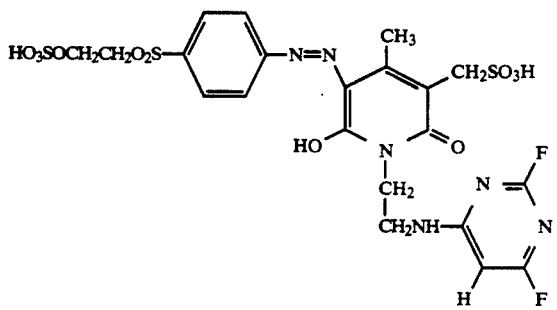 | yellowish-tinged red |

EXAMPLE 21

0.1 mol of 1-aminoethyl-3-sulphomethyl-4-methyl-6-hydroxy-pyrid-2-one are dissolved in water and reacted with 0.105 mol of 2,4,6-trifluoropyrimidine. The pH is kept at 7.5 with sodium carbonate solution. When the condensation reaction has ended, the diazotisation product prepared in Example 1 is added. Coupling is brought about by buffering to pH 5 to 6 with sodium carbonate solution. The dyestuff is salted out, filtered off with suction, dried and group. A yellow dyestuff powder which is readily soluble in water results. Deep greenish-tinged yellow dyeings are obtained on cotton with this dyestuff by one of the application processes customary for reactive dyestuffs.

The dyestuff corresponds to the formula

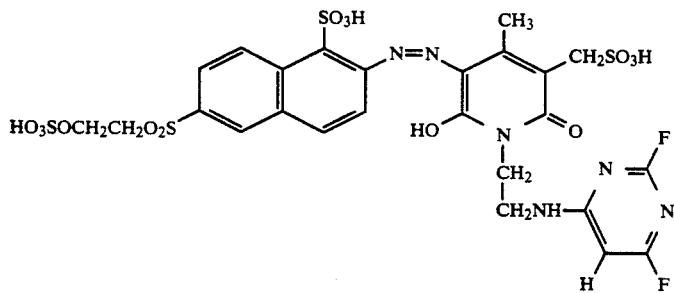

EXAMPLE 22

An equally useful dyestuff is obtained by the procedure of Example 21 using the diazotisation product from Example 2.

The dyestuff corresponds to the formula

EXAMPLE 23

If the 1-amino-8-naphthol-3,6-disulphonic acid (H acid) in Example 1 is replaced by 2-amino-8-naphthol-3,6-disulphonic acid and the procedure is otherwise as described in this example, a red powder which contains the dyestuff of the formula

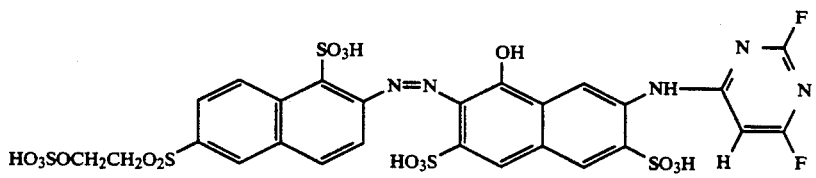

is obtained. This dyestuff dyes cotton in scarlet shades by the application methods customary for reactive dyestuffs.

EXAMPLE 24

0.1 mol of 4-acetylamino-2-aminobenzenesulphonic acid are dissolved in 100 ml of water with sodium hydroxide solution under neutral conditions, sulphuric acid is added and diazotisation is carried out with sodium nitrite solution at 0° C. After one hour, excess nitrite is removed with amidosulphonic acid. The equivalent amount of 1-(4'-hydroxyethylsulphophenyl)-pyrazol-5-one-3-carboxylic acid is added to this diazotisation product and the pH is increased to 5 with sodium hydroxide solution. When the coupling has ended, the mixture is heated, sulphuric acid is added and the acetyl group is hydrolysed at 90° C. The dyestuff precipitates and is filtered off with suction and dried. It is then introduced into monohydrate for sulphation of the hydroxyl group. After the mixture has been poured onto ice-water, a condensation reaction is carried out with 2,4,6-trifluoropyrimidine at pH 4 and 40° C. The dyestuff is salted out, isolated, dried and ground. A brownish dyestuff powder which contains the dyestuff of the formula

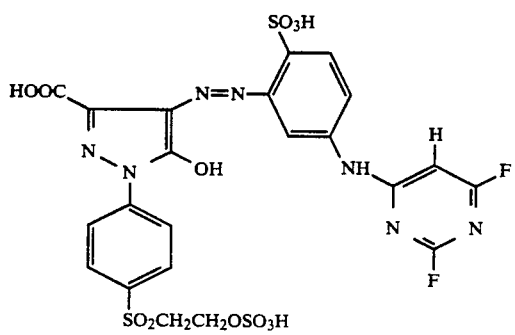

and dyes cotton in greenish-tinged yellow shades by the application methods customary for reactive dyestuffs is obtained.

EXAMPLE 25

If the procedure is analogous to Example 24 and 5-acetylamino-2-aminobenzenesulphonic acid is employed instead of 4-acetylamino-2-aminobenzenesulphonic acid, the dyestuff of the formula

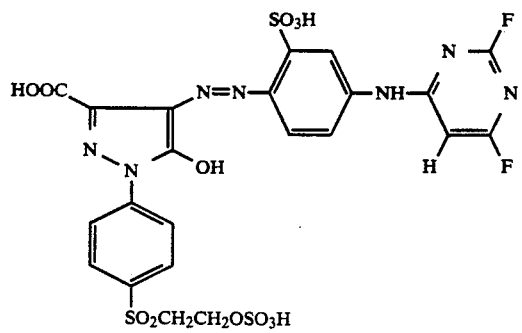

which dyes cotton is golden yellow shades by the application methods customary for reactive dyestuffs is obtained.

The dyestuffs listed in the following table, which dye cotton in the colour shades indicated, can also be obtained by methods analogous to those described.

| No. | Example | Colour shade |
|---|---|---|
| 26 | 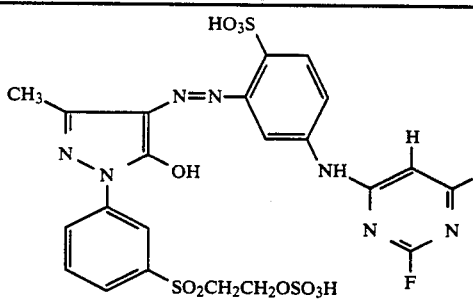 | greenish-tinged yellow |
| 27 | 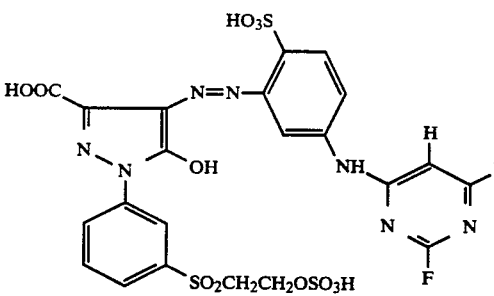 | greenish-tinged yellow |
| 28 | 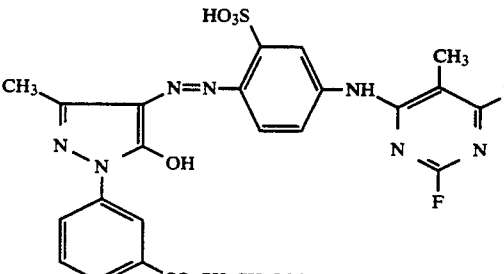 | golden yellow |

| No. | Example | Colour shade |
|---|---|---|
| 29 | (pyrazole with HOOC, N-N, OH, phenyl-SO₂CH₂CH₂OSO₃H; azo linked to HO₃S-phenyl-NH-pyrimidine with H, F, F) | golden yellow |
| 30 | (pyrazole with CH₃, N-N, OH, phenyl-SO₂CH₂CH₂OSO₃H; azo to HO₃S-phenyl-NH-pyrimidine H, F, F) | greenish-tinged yellow |
| 31 | (pyrazole with CH₃, N-N, OH, phenyl-SO₂CH₂CH₂OSO₃H; azo to HO₃S-phenyl-NH-pyrimidine H, F, F) | golden yellow |
| 32 | HO₃SOCH₂CH₂O₂S–phenyl–N=N–naphthalene(OH, HO₃S, SO₃H)–NH–pyrimidine(F, H, F) | Scarlet |
| 33 | HO₃SOCH₂CH₂O₂S–phenyl–N=N–naphthalene(OH, HO₃S)–N(CH₂CH₂OSO₃H)–C(=CH–)pyrimidine(F, F) | " |
| 34 | HO₃SOCH₂CH₂O₂S–naphthalene(SO₃H)–N=N–naphthalene(OH, HO₃S)–N(CH₂CH₂OSO₃H)–C(=CH–)pyrimidine(F, F) | " |

-continued

| No. | Example | Colour shade |
|---|---|---|
| 35 | (structure) | Orange |
| 36 | (structure) | Scarlet |
| 37 | (structure) | Orange |
| 38 | (structure) | Scarlet |
| 39 | (structure) | Orange |
| 40 | (structure) | Scarlet |
| 41 | (structure) | Orange |

| No. | Example | Colour shade |
|---|---|---|
| 42 | ![structure] | " |
| 43 | ![structure] | Scarlet |
| 44 | ![structure] | Scarlet |

EXAMPLE 45

0.1 mol of 1-(4'-amino-3'-methyl-5-pyrazolone are dissolved in 400 ml of water with sodium hydroxide solution under neutral conditions, the pH is brought to 4 with hydrochloric acid and acylation is carried out with the equivalent amount of 2,4,6-trifluoropyrimidine at 35° C., the hydrochloric acid formed being neutralised with sodium carbonate solution. A diazotisation product of 2-amino-6-sulphatoethylsulphonyl-naphthalene-1-sulphonic acid prepared as in Example 1 is added to the coupling component thus prepared and the pH is kept at 4 with sodium acetate solution. When the coupling has ended, the dyestuff is salted out, isolated, dried and ground. A brownish powder which contains the dyestuff of the formula

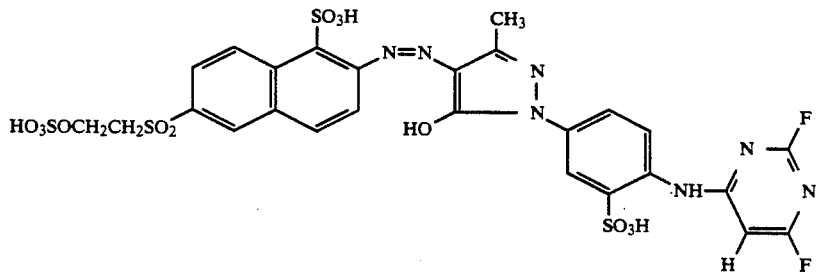

and dyes cotton in yellow shades is obtained.

EXAMPLE 46

If the diazotisation product of 1-amino-4-sulphatoethylsulphonylbenzene is employed instead of the diazotisation product of 2-amino-6-sulphatoethylsulphonyl-naphthalene-1-sulphonic acid in Example 45, a useful dyestuff of the formula

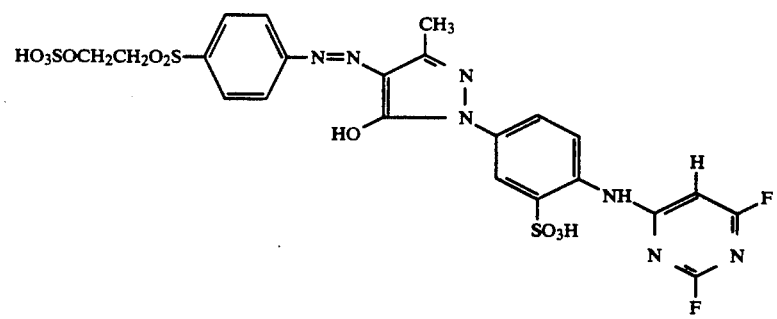

which dyes cotton in yellow shades by the application processes customary for reactive dyestuffs is likewise obtained.

EXAMPLE 47

4-Acetylamino-2-amino-benzene-1-sulphonic acid is added to the diazotisation product of 1-amino-4-sulphatoethyl-sulphonylbenzene, prepared analogously to Example 2, and the pH is increased to and kept at pH 2 with sodium acetate solution. When the coupling has ended, acylation is carried out with 2,4,6-trifluoropyrimidine at pH 4 and 40° C., the hydrofluoric acid formed being neutralised with sodium carbonate solution. After the end of the condensation, the dyestuff is salted out, isolated, dried and ground. The dyestuff of the formula

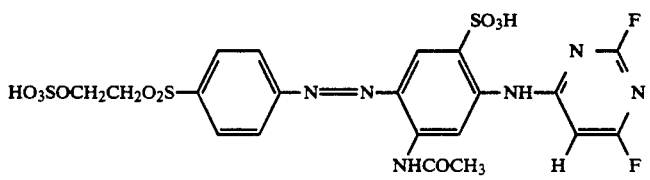

dyes cotton in yellow shades.

EXAMPLE 48

It the diazo component in Example 47 is replaced by the diazo component of Example 1, a dyestuff of the formula

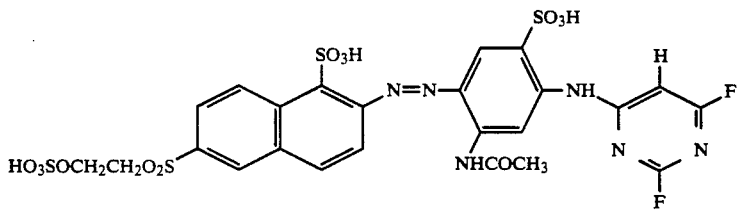

which dyes cotton in yellow shades is obtained.

EXAMPLE 49

0.1 mol of the azo dyestuff of the formula

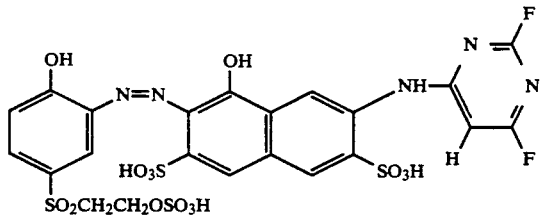

is dissolved in 1 l of water under neutral conditions. 28 g of copper sulphate ($CuSO_4 \cdot 5H_2O$) are sprinkled in at room temperature and the pH is kept between 5.5 and 6.5 by simultaneous dropwise addition of sodium carbonate solution. When the coppering has ended, the dyestuff is salted out with sodium chloride, filtered off with suction, dried and ground.

A dark powder which readily dissolves in water and dyes cotton ruby by one of the dyeing processes customary for reactive dyestuffs is obtained. The dyestuff corresponds to the formula

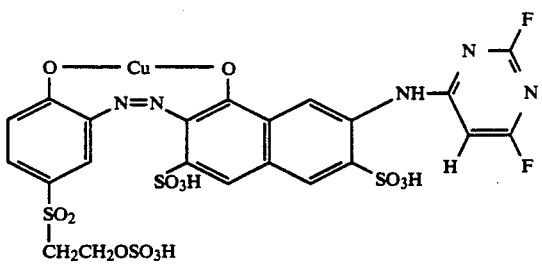

The azo dyestuff used in this example is obtained by diazotising 2-amino-4-sulphatoethylsulphonylphenol and coupling the diazotisation product, at pH 5.5 to 6.5, to the condensation product obtained by acylation of 2-amino-8-hydroxy-naphthalene-3,6-disulphonic acid with 2,4,6-trifluoropyrimidine.

EXAMPLE 50

0.1 mol of the azo dyestuff of the formula

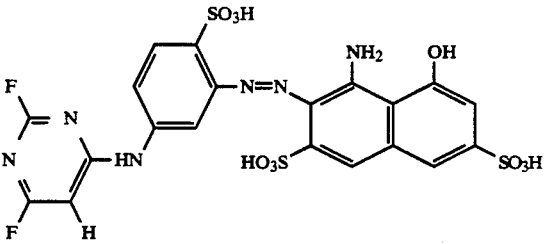

are stirred into water at 10° C. and pH 7.5. The aqueous-hydrochloric acid diazotisation product of an equivalent amount of 2-amino-6-(2-sulphatoethyl)sulphonyl-1-naphthalene-sulphonic acid is added and the pH is simultaneously kept constant at between 6.5 and 7.5 by metering in potassium bicarbonate solution. When the coupling has ended, the dyestuff is salted out, isolated, dried and ground. A black powder which dyes cotton in navy blue shades is obtained. The dyestuff corresponds to the formula

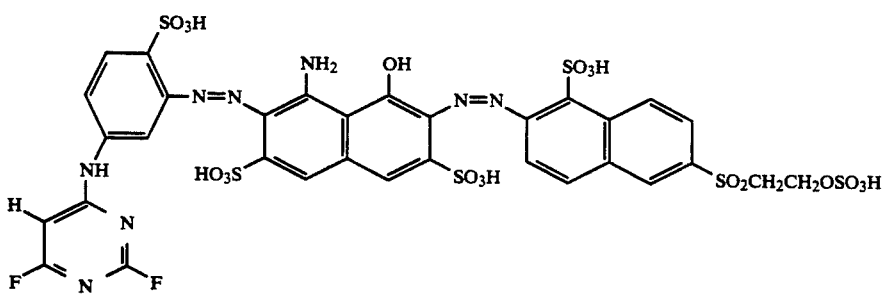

In Example 51 the following is obtained in an analogous procedure by varying the diazo component and coupling sequence:

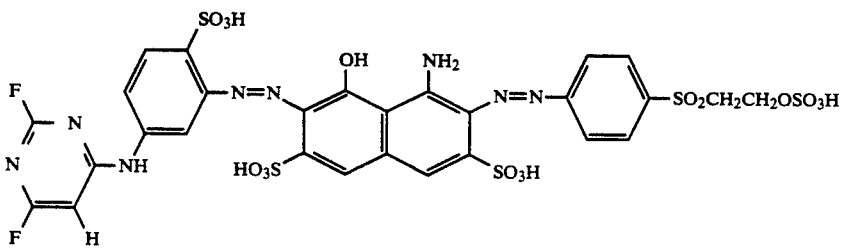

EXAMPLE 52

The condensation product, prepared at pH 4 and 40° C., of 1-hydroxy-3-sulpho-7-(2'-sulpho-4'-aminophenylamino)-naphthalene and 2,4,6-trifluoropyrimidine is added to the diazotisation product, prepared analogously to Example 5, of 1-amino-4-sulphatoethylsulphonylbenzene. The dyestuff of the formula ethylsulphonylbenzene and the pH is brought to 4.5 by addition of sodium acetate solution. After the mixture has been stirred at 10 to 15° C. for 2 hours, the diazotisation product is no longer detectable. The mixture is cooled to 0 to 5° C. and diazotisation is carried out with sodium nitrite solution in the presence of hydrochloric acid. After 1 hour, excess nitrous acid is destroyed with amidosulphonic acid. 2-Amino-1-naphthalenesulphonic acid is introduced into the diazotisation product, the pH is increased to 4 to 5 with sodium carbonate solution and the mixture is subsequently stirred for 2 hours.

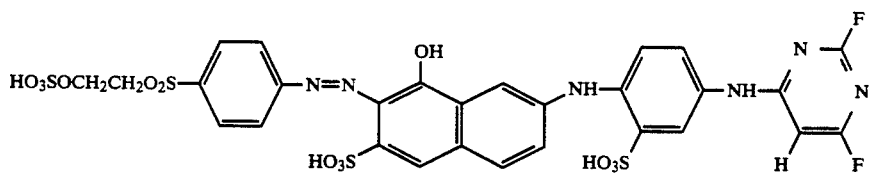

is prepared by establishing a pH of 6 to 7 with sodium carbonate solution. When the coupling has ended, the dyestuff is salted out, isolated, dried and ground. A dark brown powder which is readily soluble in water and dyes cotton brown is obtained.

When the coupling has ended, acylation is carried out with 2,4,6-trifluoropyrimidine at pH 4 and 50° C. The dyestuff is salted out, isolated, dried and ground. A dark brown dyestuff powder which contains the dyestuff of the formula

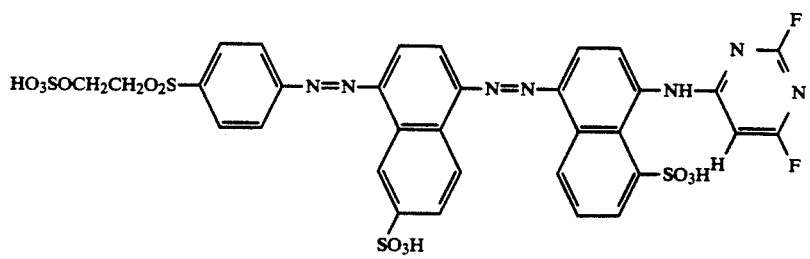

EXAMPLE 53

The equivalent amount of 5-amino-2-naphthalenesulphonic acid is added to the diazotisation product, prepared analogously to Example 5, of 1-amino-4-sulphatoand dyes cotton in brown shades is obtained.

EXAMPLE 54

The dyestuff of the formula

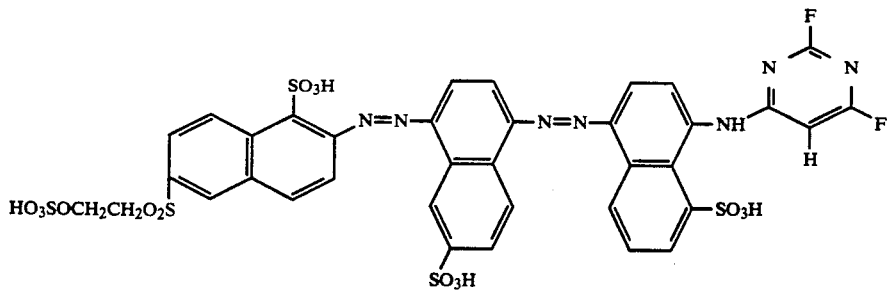

which dyes cotton in brown shades by the application methods customary for reactive dyestuffs, is obtained by the procedure of Example 53 using the diazotisation product of 2-amino-6-sulphatoethylsulphonyl-naphthalene-1-sulphonic acid.

EXAMPLE 55

The dyestuff of the formula

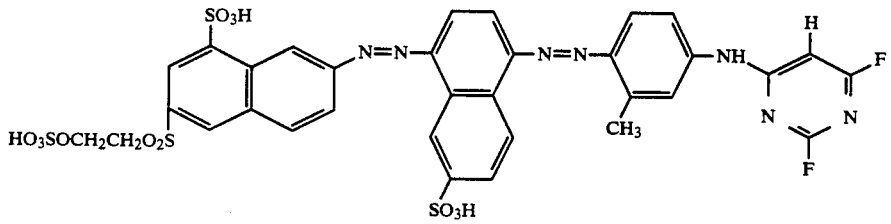

which dyes cotton in brown shades, is obtained by the procedure of Example 53 using the diazotisation product of 7-amino-3-sulphatoethylsulphonyl-naphthalene-1-sulphonic acid and m-toluidine as the 2nd coupling component.

The dyestuffs listed in the following table, which dye cotton in the colour shade indicated, can also be prepared by methods analogous to those described.

| No. | Example | Colour shade |
|---|---|---|
| 56 | | Yellow |
| 57 | | " |
| 58 | | " |

| No. | Example | Colour shade |
|---|---|---|
| 59 | 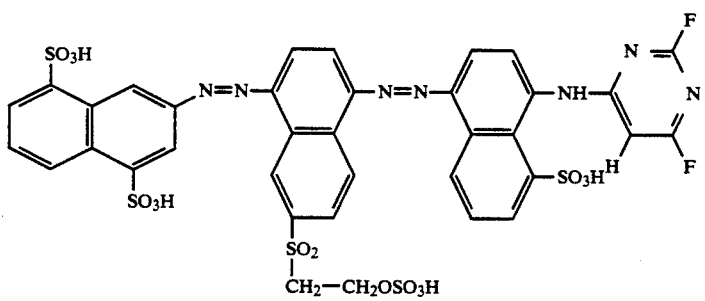 | Yellow |

EXAMPLE 60

30.3 parts of 2-naphthylamine-4,8-disulphonic acid are suspended in 400 parts by volume of ice-water. 25 parts by weight of concentrated hydrochloric acid are added and diazotisation is carried out with 20 parts by volume of 5N sodium nitrite. The mixture is subsequently stirred at 0 to 5° C. for a further hour and excess nitrous acid is then destroyed with a little amidosulphonic acid. 33.1 parts of 1-naphthylamine-6-β-sulphatoethyl-sulphone are then added and the pH is slowly increased to 4.5 by means of sodium acetate. The mixture is subsequently stirred at this pH and at 10 to 15° C. for a further 2 hours, until free diazonium compound is no longer detectable. It is then cooled again to 0 to 5° C. and 35 parts of concentrated hydrochloric acid and then 22 parts by volume of a 5N sodium nitrite solution are added. The mixture is subsequently stirred at 0 to 5° C. for 1 hour and a little amidosulphonic acid is then added.

22.5 parts of 1-naphthylamine-8-sulphonic acid are then introduced into the solution and a pH of 4 to 5 is established and maintained with about 15 parts of sodium carbonate, the mixture being subsequently stirred for 2 hours. The dyestuff solution is then brought to pH 5.5 to 6.0 and heated to 50° C. 16 parts of 2,4,6-trifluoropyrimidine are added at this temperature and at this pH and the mixture is subsequently stirred for 1 hour, a pH of 5.5 to 6.0 being maintained. The dyestuff is isolated from the solution with potassium chloride and sodium chloride.

After drying at 40 to 50° C. and grinding, a black dyestuff powder which contains the alkali metal salt of the compound of the formula

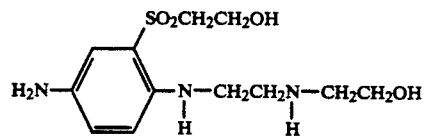

is obtained. This compound has very good dyestuff properties and dyes cotton and wool in brown shades with very good wet-fastness properties by the dyeing and printing methods customary for reactive dyestuffs.

EXAMPLE 61

0.2 mol of the compound

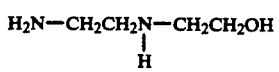

prepared by reaction of 1-chloro-2-(β-hydroxyethylsulphonyl)-4-nitrobenzene with the glacial acetic acid adduct of the diamine of the formula $$H_2N-CH_2CH_2N-CH_2CH_2OH$$
$$|$$
$$H$$

in isopropanol and subsequent catalytic hydrogenation with Raney nickel and hydrogen, is subjected to a condensation reaction with 0.1 mol of chloranil in isopropanol and in the presence of sodium acetate at 80° C. The dark brown product of the formula

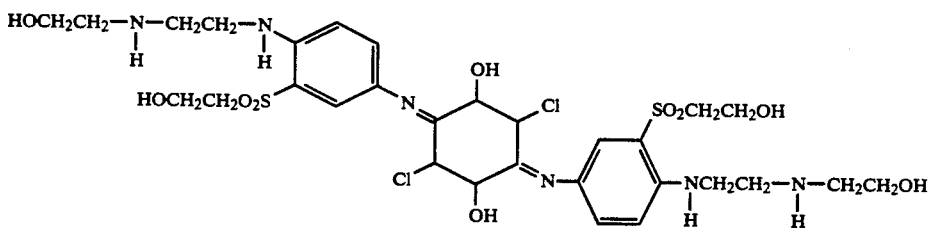

which has precipitated in filtered off with suction, dried and introduced into 250 ml of 20% strength oleum. Potassium peroxodisulphate is added to this mixture and the mixture is heated in stages up to 40 to 50° C. It is then poured onto ice and the blue colour base having the structure

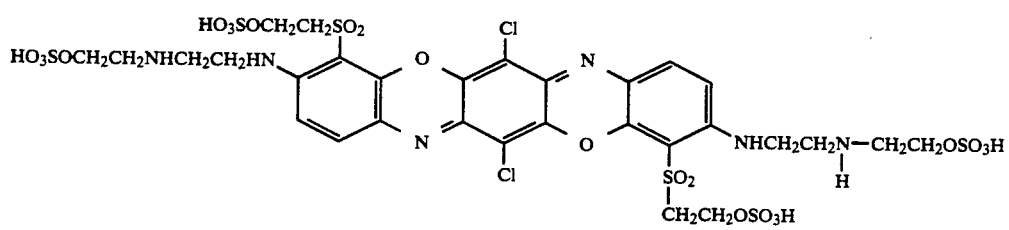

is isolated, stirred into water and subjected to a condensation reaction with 0.2 mol of 2,4,6-trifluoropyrimidine at 40° C. and pH 6.5 to 7.5.

The dyestuff is salted out with sodium chloride, isolated, dried and ground. A dark dyestuff powder which contains the dyestuff of the formula

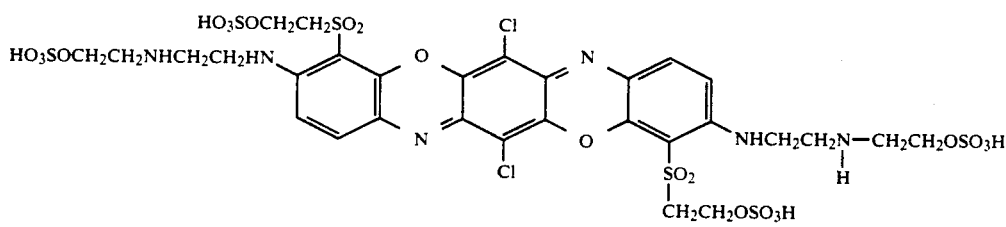

and dyes cotton and wool in blue shades by the dyeing and printing methods customary for reactive dyestuffs is obtained.

EXAMPLE 62

52 g of the dyestuff 1-amino-4-(3'-amino-4'-β-hydroxyethylsulphonyl-phenylamino)-anthraquinone-2-sulphonic acid (prepared by condensation of 1,3-diaminobenzene-4-β-hydroxyethyl-sulphone and 1-amino-4-bromoanthraquinone-2-sulphonic acid) are introduced as dry, ground goods into 200 g of monohydrate, while stirring. The mixture is subsequently stirred at room temperature overnight and the solution is then poured onto a mixture of 500 g of ice and 150 g of potassium chloride, while stirring.

The dyestuff which as precipitated is then filtered off with suction, washed with saturated sodium chloride solution and dissolved in 300 parts of water, with the addition of sodium bicarbonate, under neutral conditions.

18 g of 2,4,6-trifluoropyrimidine are added dropwise to the solution, the mixture is heated to 40 to 50° C. and the pH is kept between 5 and 6 by dropwise addition of sodium carbonate solution. When the condensation reaction has ended, the mixture is clarified and the dyestuff is precipitated from the filtrate by salting out. A clear blue with good general fastness properties is obtained on cotton by one of the application processes customary for reactive dyestuffs.

The dyestuff corresponds to the formula

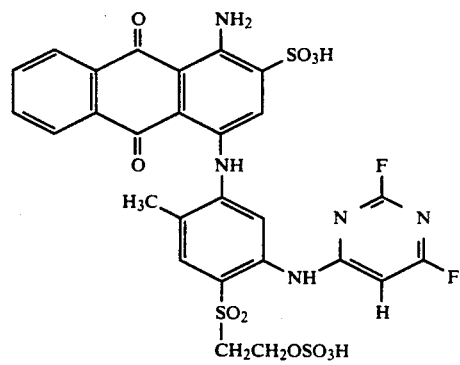

EXAMPLE 63

54 g of the dyestuff 1-amino-4-(2'-methyl-5'-amino-4'-β-hydroxyethylsulphonyl-phenylamino-anthraquinone-2-sulphonic acid (prepared by condensation of 1-amino-4-bromo-anthraquinone-2-sulphonic acid and 2,4-diaminotoluene-5-β-hydroxyethyl-sulphone) are reacted analogously to Example 62.

The dyestuff of the formula

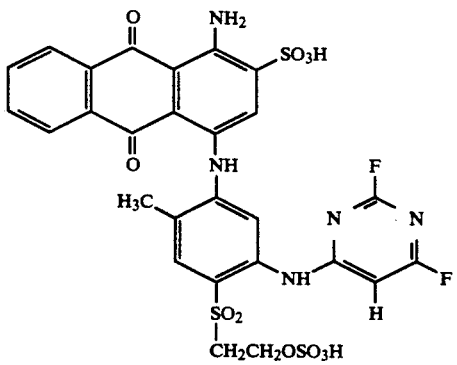

which dyes wool and cotton a fast, clear blue is obtained.

phenylaminosulphonyl)-copper phthalocyanine-disulphonic acid (prepared by cocondensation of the copper phthalocyanine-3-tetrasulphonyl chloride with 1,3-diaminobenzene-4-sulphonic acid and 3-β-sulphatoethylsulphonyl-aniline in aqueous solution in the presence of pyridine at pH 6 to 7.5) are dissolved in water, with the addition of sodium bicarbonate, under neutral conditions. 18 g of 2,4,6-trifluoropyrimidine are added dropwise to this solution, the mixture is heated to 40 to 45° C. and the pH is kept between 6 and 6.5 by dropwise addition of sodium carbonate solution.

When the condensation reaction has ended, the mixture is clarified and the dyestuff is precipitated from the filtrate by addition of sodium chloride. After filtration with suction, drying and grinding, a blue dyestuff powder which readily dissolves in water giving a turquoise blue colour is obtained.

The dyestuff corresponds to the formula

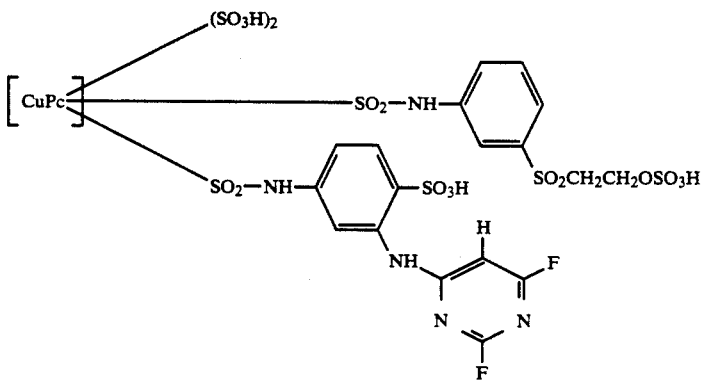

It dyes cotton in a turquoise blue shade.

The following dyestuffs can be prepared by the procedure of Example 62.

The dyestuffs listed below, which dye cotton in the

| | Colour shade on cotton |
|---|---|
| Example 64 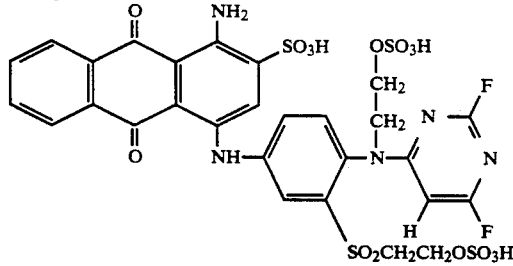 | greenish-tinged blue |
| Example 65 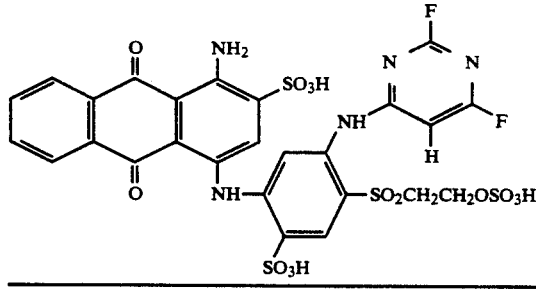 | blue |

EXAMPLE 66

127 g of the dyestuff (3-amino-4-sulphophenylaminosulphonyl)-(3-β-sulphatoethylsulphonylcolour shade indicated, can be prepared by a procedure analogous to that of Example 66.

| | Colour shade on cotton |
|---|---|
| Example 67 | turquoise |
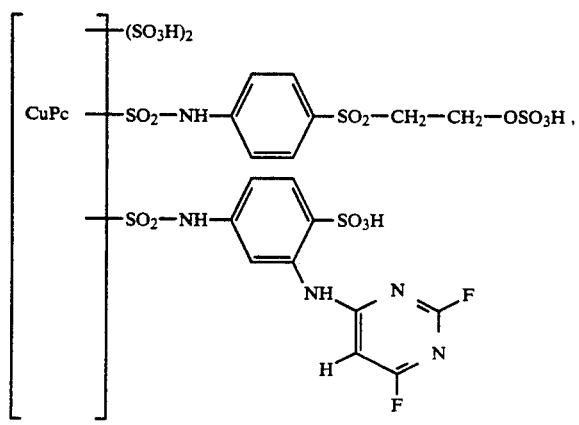
| | |
|---|---|
| Example 68 | turquoise |
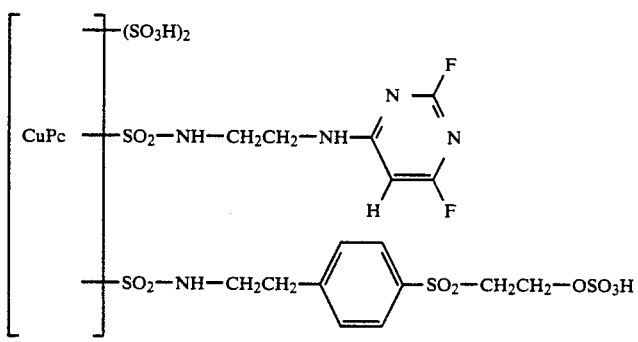
| | |
|---|---|
| Example 69 | turquoise |
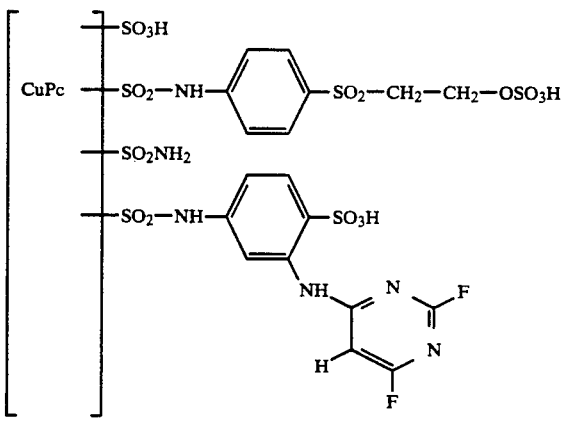
| | |
|---|---|
| Example 70 | green |

| | Colour shade on cotton |
|---|---|
| 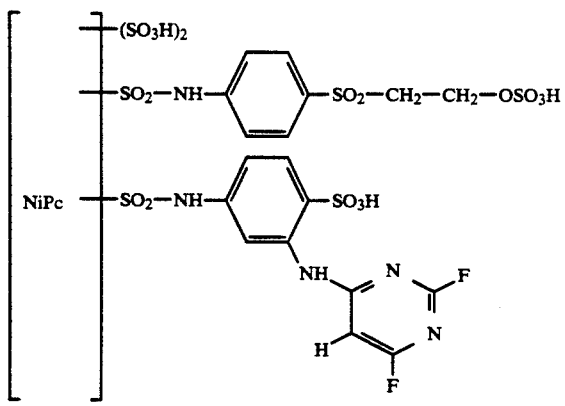 | |

EXAMPLE 71

135 g of the dyestuff (3-amino-4-β-sulphatoethylsulphonyl-phenylaminosulphonyl)-copper phthalocyaninetrisulphonic acid are dissolved under neutral conditions. The solution is heated to 50° C.

18 g of 2,4,6-trifluoropyrimidine are then added dropwise and the pH is kept at 5.5 to 6.0 by addition of sodium bicarbonate. When the condensation reaction has ended, the dyestuff solution is clarified and the dyestuff is salted out from the filtrate by addition of sodium chloride. After filtration with suction, drying and grinding, a blue dyestuff powder which dissolves in water giving a turquoise blue colour is obtained. The dyestuff corresponds to the formula

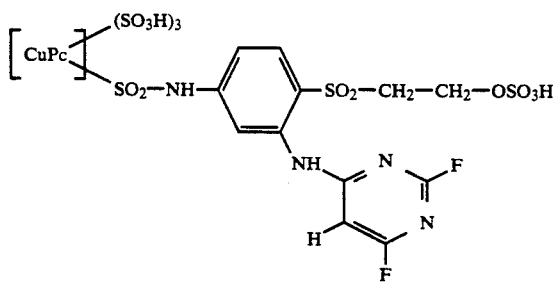

and dyes cotton in fast, turquoise blue colour shades.

The compound used as the starting substance is prepared as follows: copper phthalocyanine-trisulphonyl chloride monosulphonic acid is subjected to a condensation reaction with 1,3-diaminobenzene-4-β-hydroxyethyl-sulphone in aqueous solution at pH 6 to 7. The condensation product is precipitated by addition of sulphuric acid, isolated and dried.

After grinding, the substance is esterified in sulphuric acid (monohydrate) by the customary methods. The mixture is then poured onto ice, while stirring, and the compound which has precipitated is isolated on a suction filter and dissolved in water, with the addition of sodium bicarbonate, under neutral conditions.

The following dyestuffs are obtained by a procedure analogous to that described.

| | Colour shade on cotton |
|---|---|
| Example 72 | green |
| 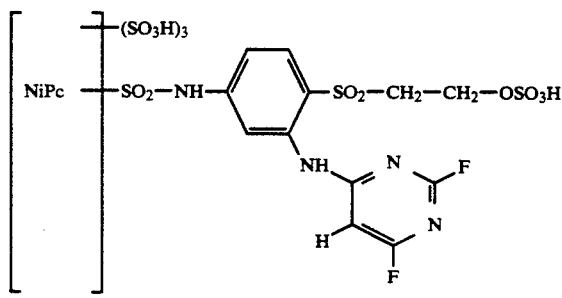 | |
| Example 73 | greenish-tinged turquoise |

| | Colour shade on cotton |
|---|---|
| 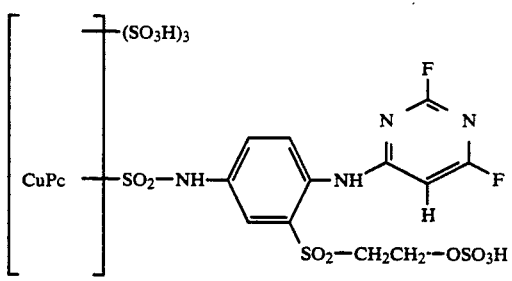 | |
| Example 74 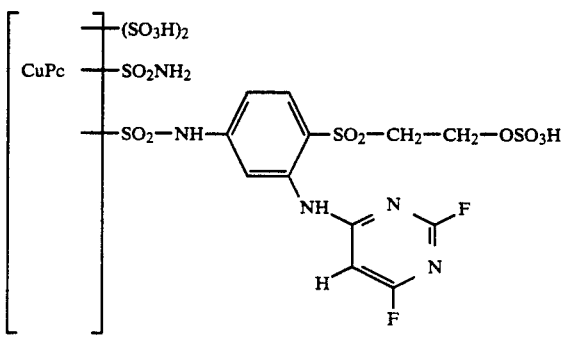 | greenish-tinged turquoise |

23.3 g of 2-carboxyphenylhydrazine-4-sulphonic acid and 21.3 g of 4-acetaminobenzaldehyde-2-sulphonic acid are subjected to a condensation reaction in aqueous solution and the resulting hydrazone is coupled with the diazonium compound of 22.7 g of 2-aminophenol-4-(β-hydroxyethyl)-sulphone in the presence of sodium carbonate and 25 g of copper sulphate. When the reaction has ended, hydrolysis is carried out at 100° C., with the addition of 15 g of sodium carbonate, until complete hydrolysis of the acetyl group can be detected by thin layer chromatography. The dyestuff is then precipitated by addition of sodium chloride, isolated and dried. After grinding, the dyestuff powder is introduced into pyridine, while stirring.

The mixture is heated to 80° C. and the same amount of amidosulphonic acid as dyestuff powder is added. During this addition, the temperature rises to 105° C. The mixture is subsequently stirred at 100 to 105° C. for a further ½ hour. The pyridine is then removed by distillation and drying in vacuo and the residue is dissolved in water and subjected to a condensation reaction with 18 g of 2,4,6-trifluoropyrimidine at 40° C. and pH 6 to 6.5. When the reaction has ended, the dyestuff is precipitated with sodium chloride, isolated and dried. After grinding, a dyestuff powder which contains the sodium salt of the compound of the formula

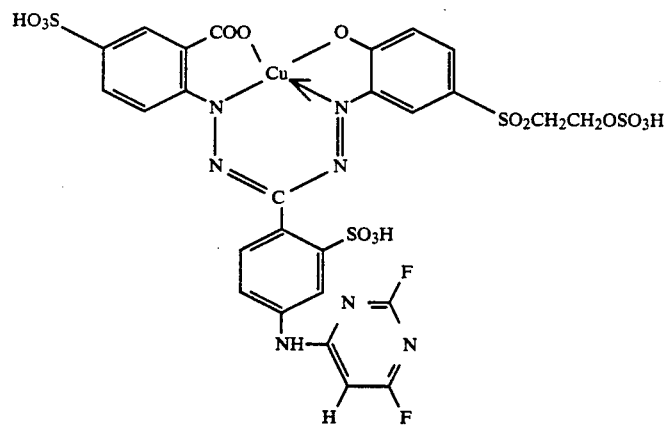

and dyes cotton with a blue shade is obtained.

Further blue reactive dyestuffs according to the invention are obtained when, as described in Example 75, the following phenylhydrazines and aromatic aldehydes are reacted to give hydrazones, the products are coupled with the diazo components also shown below in the presence of CuSO₄ and the dyestuffs formed are hydrolysed, sulphated and acylated with 2,4,6-trifluoropyrimidine, analogously to Example 75.

| Phenylhydrazine | Aldehyde | Diazo components |
|---|---|---|
| 2-Carboxy-5-(β-hydroxyethyl- | Benzaldehyde | 3-Acetylamino-4-hydroxy-5-aminobenzenesulphonic |

-continued

| Phenylhydrazine | Aldehyde | Diazo components |
|---|---|---|
| sulphonyl)-phenylhydrazine | | acid |
| 2-Carboxy-4-acetylamino-phenylhydrazine | Benzaldehyde | 4-β-Hydroxyethylsulphonyl-2-aminophenol-6-sulphonic acid |

We claim:
1. A metal-free dyestuff of the formula

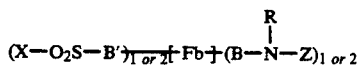

and metal complex thereof wherein
Fb = the radical of a dyestuff selected from the group consisting of mono- or polyazo radicals,
B and B' = a direct bond or an aliphatic or aromatic bridge member to a ring C atom of an aromatic-carbocyclic ring or to a ring C or N atom of an aromatic-heterocyclic ring in Fb,
X = CH=CH$_2$ or CH$_2$CH$_2$—Y, wherein
Y = OSO$_3$H, SSO$_3$H, OCOCH$_3$, OPO$_3$H$_2$, OSO$_2$CH$_3$, SCN, NHSO$_2$CH$_3$, Cl, Br, F, OCOC$_6$H$_5$, OSO$_2$—C$_6$H$_4$CH$_3$,

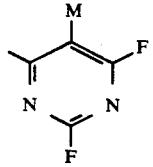

R = H or C$_1$–C$_4$-alkyl, which is unsubstituted or substituted by halogen, hydroxyl, cyano, C$_1$–C$_4$-alkoxy, carboxyl, sulpho or sulphato,
Z = a fibre-reactive radical of the formula

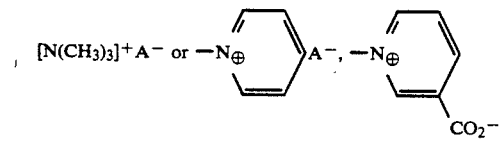

wherein
M = H, C$_1$–C$_4$-alkyl, C$_1$–C$_4$-thioalkyl, F or CF$_3$,
with the exception of the dyestuff of the formula

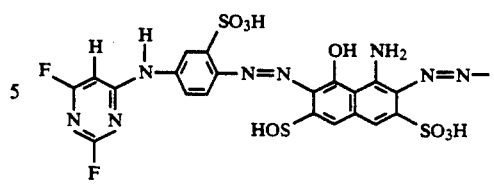

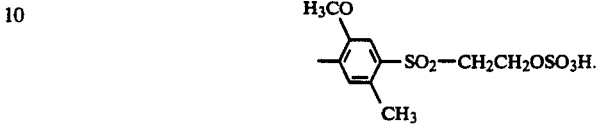

2. A dyestuff according to claim 1, characterised in that
B, B' = a direct bond
—SO$_2$X = —SO$_2$CH=CH$_2$ or —SO$_2$CH$_2$CH$_2$OSO$_3$H and
Z =

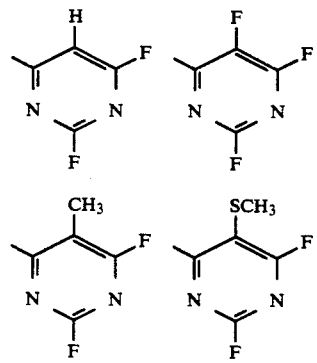

the dyestuffs containing 1 to 6 sulpho groups.
3. A dyestuff according to claim 1, of the formula

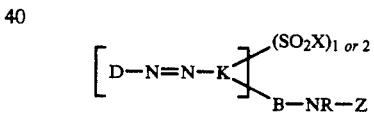

wherein
D = the radical of a diazo component selected from the group consisting of benzene and naphthalene and
K = the radical of a coupling components selected from the group consisting of benzene, naphthalene, acetoacetic acid arylide heterocyclic radical
or a metal complex thereof.
4. A dyestuff of claim 1, of one of the formulae

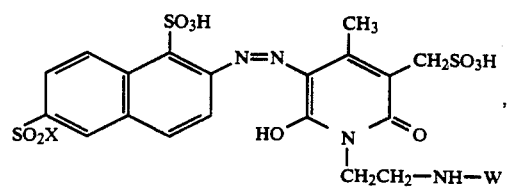

-continued
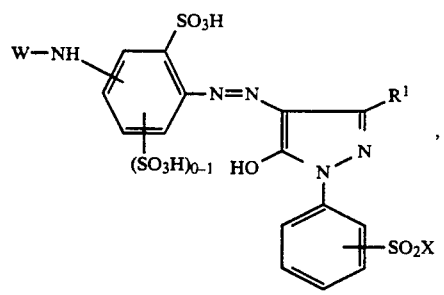
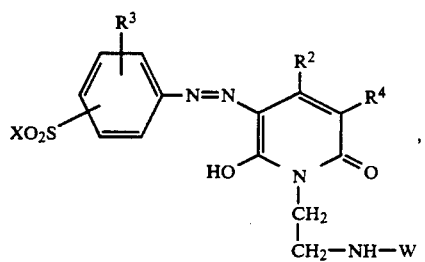
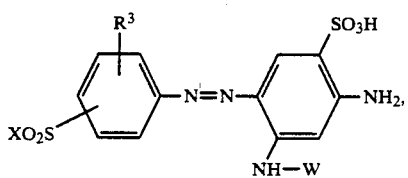
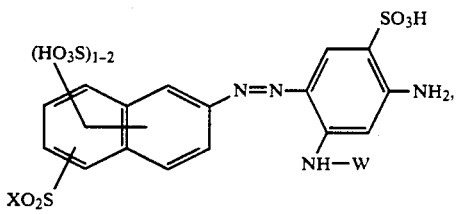
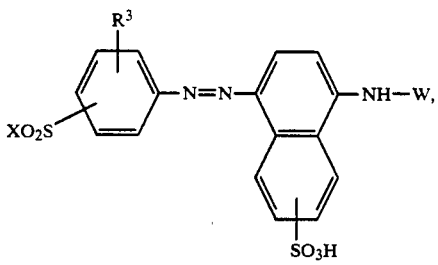
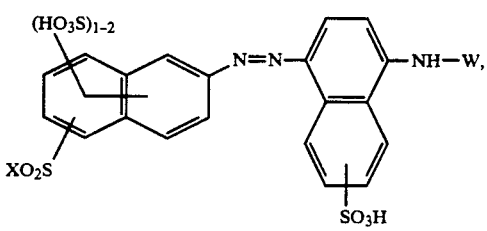
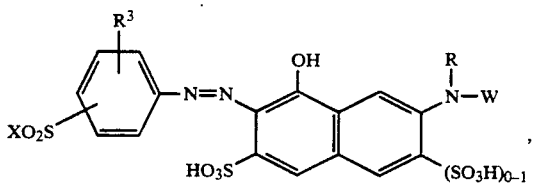

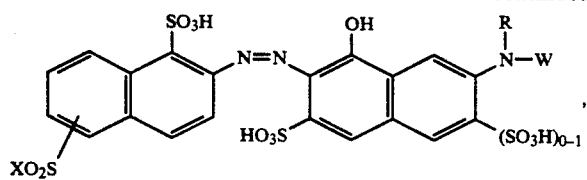
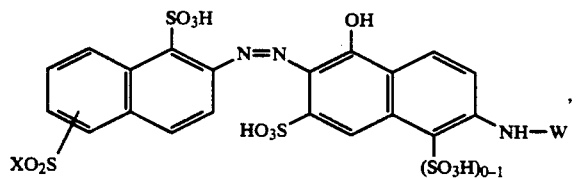
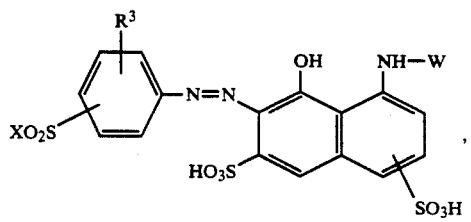
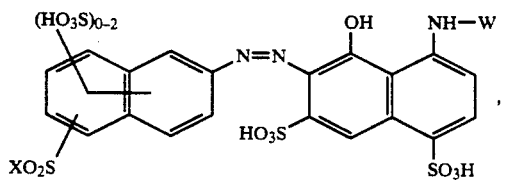
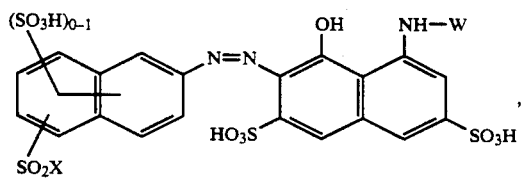
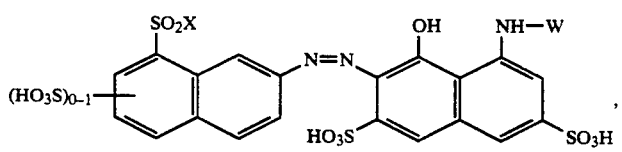
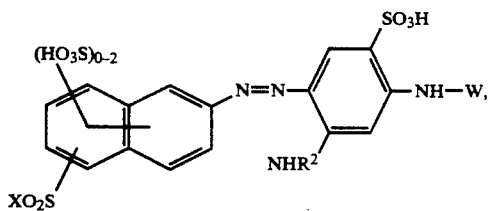
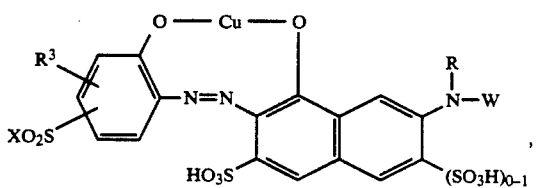

-continued
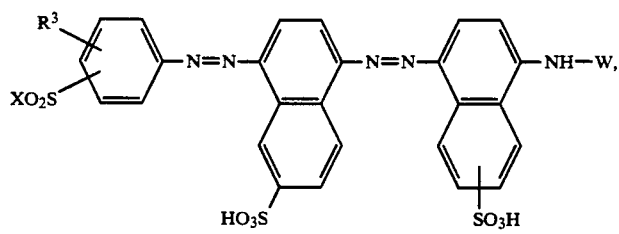
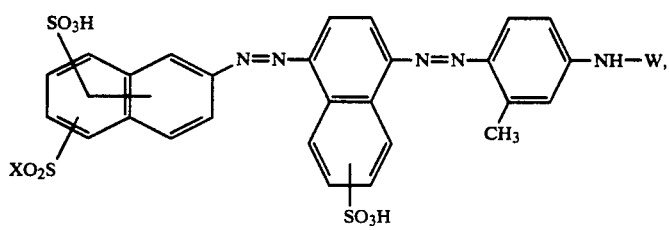
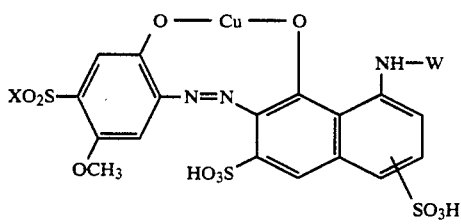
,
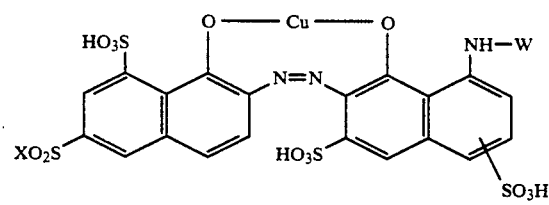
,
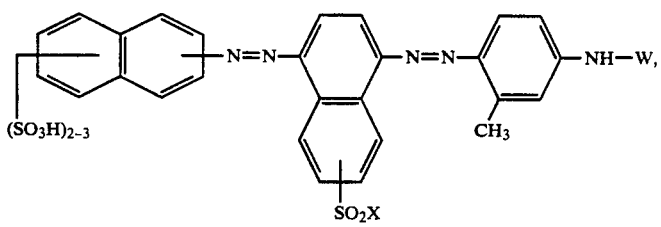
,
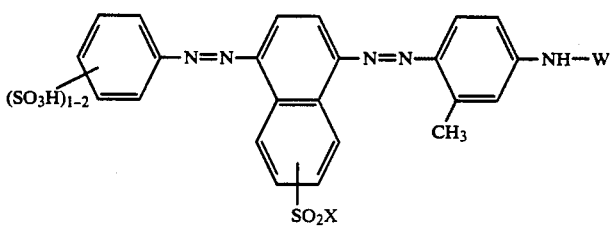
or -continued

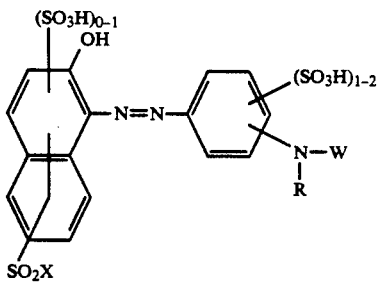

where
X=—CH₂CH₂OSO₃H or —CH=CH₂,
W=

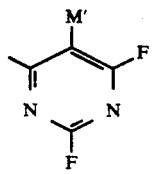

wherein
M'=H, F, CH₃ or SCH₃,
R¹=CH₃ or CO₂H,
R²=C₁-C₄-alkyl, CH₂SO₃H or COOH,
R³=H, C₁-C₄-alkyl, C₁-C₄-alkoxy, Cl, Br, COOH or SO₃H and
R⁴=H, SO₃H, CH₂SO₃H, Cl, C₁-C₄-alkylsulphonyl, carboxamide or carboxylic acid, mono- or di-C₁-C₄-alkylamide.

5. A dyestuff of the formula

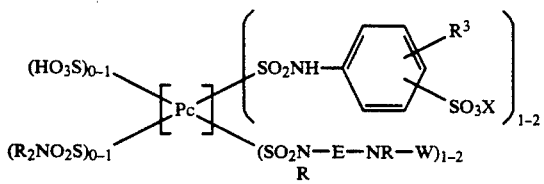

wherein Pc represents Cu phthalocyanine or Ni phthalocyanine radical and the total number of substituents on the Pc structure is not more than 4; wherein R, R₂ and R³=H or C₁-C₄-alkyl, which is unsubstituted or substituted by halogen, hydroxyl, cyano, C₁₋₄ alkoxy, carboxyl, sulpho, or sulphato
E=aliphatic bridge member
W=

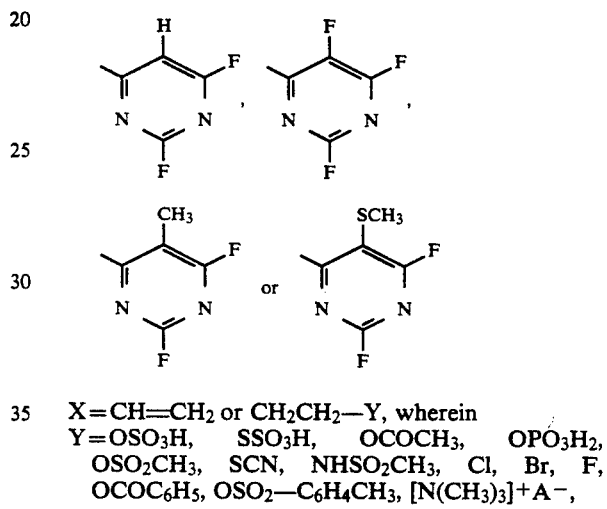

X=CH=CH₂ or CH₂CH₂—Y, wherein
Y=OSO₃H, SSO₃H, OCOCH₃, OPO₃H₂, OSO₂CH₃, SCN, NHSO₂CH₃, Cl, Br, F, OCOC₆H₅, OSO₂—C₆H₄CH₃, [N(CH₃)₃]⁺A⁻,

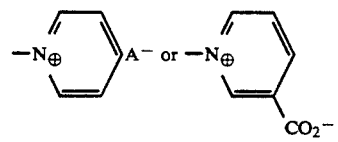

wherein A=halide or sulphate.

6. A dyestuff of the formula

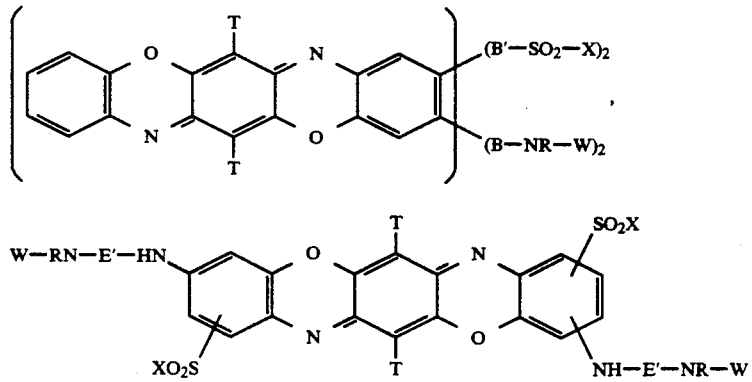

or

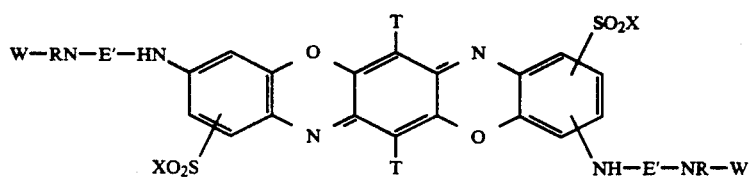

-continued

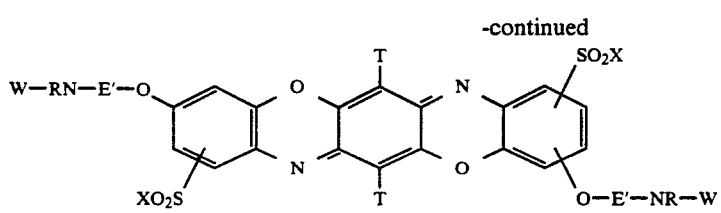

wherein
B and B' = a direct bond or an aliphatic or aromatic bridge member,
R = H or $C_1$-$C_4$-alkyl, which is unsubstituted or substituted by halogen, hydroxyl, cyano, $C_1$-$C_4$-alkoxy, carboxyl, sulpho or sulphato,
X = CH=$CH_2$ or $CH_2CH_2$—Y, wherein
Y = $OSO_3H$, $SSO_3H$, $OCOCH_3$, $OPO_3H_2$, $OSO_2CH_3$, SCN, $NHSO_2CH_3$, Cl, Br, F, $OCOC_6H_5$, $OSO_2$—$C_6H_4CH_3$, $[N(CH_3)_3]^+A^-$,

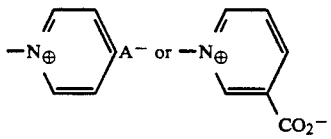

wherein A = halide or sulphate
E' = an aliphatic or aromatic bridge member
W =

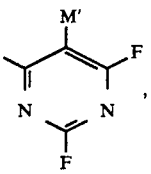

M' = H, F, $CH_3$ or $SCH_3$ and
T = Cl, Br, or $CH_3$.

7. A dyestuff of the formula

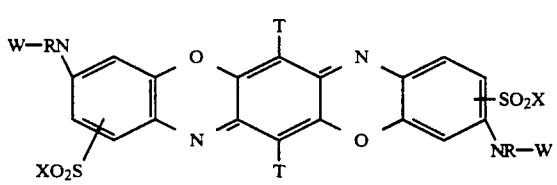

in which
R = H or $C_1$-$C_4$ alkyl, which is unsubstituted or substituted by halogen, hydroxyl, cyano, $C_1$-$C_4$-alkoxy, carboxyl, sulpho or sulphato
X = $CH_2$=$CH_2$ or $CH_2CH_2$—Y, wherein
Y = $OSO_3H$, $SSO_3H$, $OCOCH_3$, $OPO_3H_2$, $OSO_2CH_3$, SCN, $NHSO_2CH_3$, Cl, Br, V, $OCOC_6H_5$, $OSO_2$—$C_2$—$C_6H_4CH_3$, $^+A^-$,

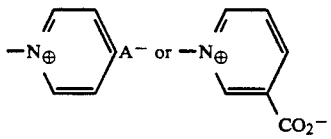

wherein A = halide or sulphate

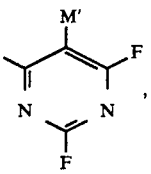

M' = H, F, $CH_3$ or $SCH_3$ and
T = Cl, Br, $OCH_3$.

8. Process for dyeing and printing cellulose or polyamide materials with a dyestuff, characterised in that at least one dyestuff according to claim 1 is used.

9. Dyed or printed cellulose or polyamide material characterised in that they are dyed or printed with dyestuffs according to claim 1.

10. A dyestuff or one of the formula

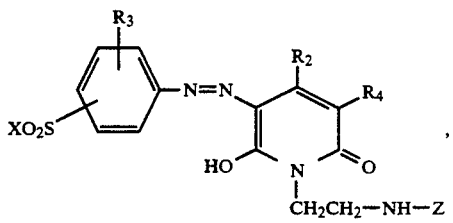

-continued
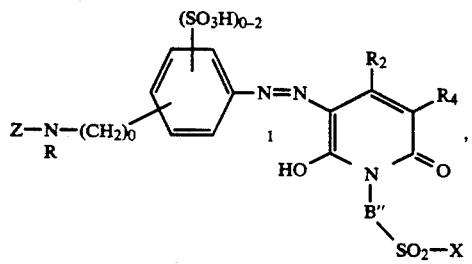
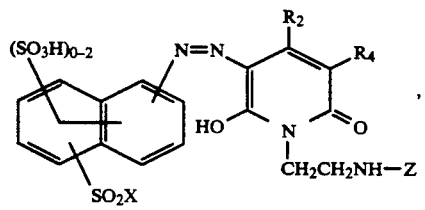
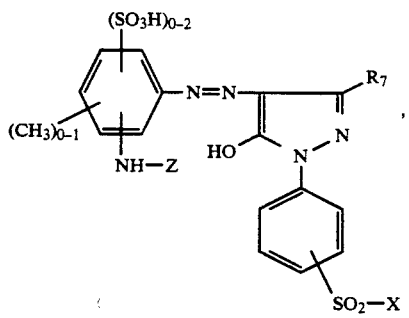
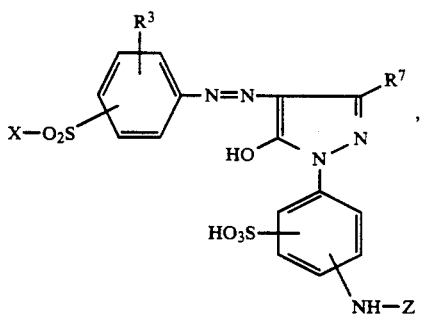
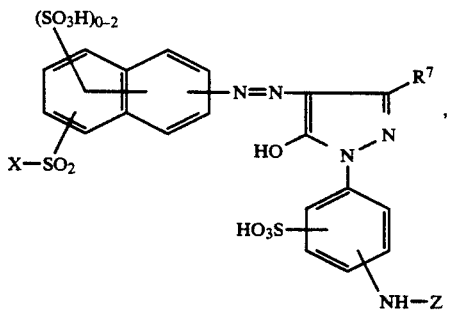
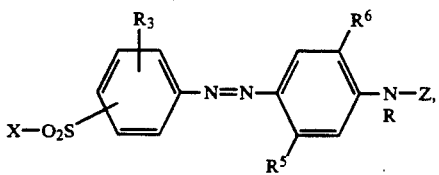

-continued
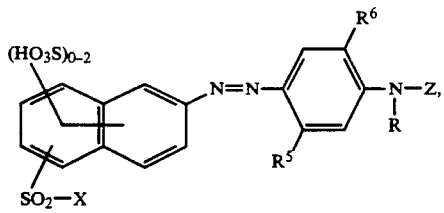
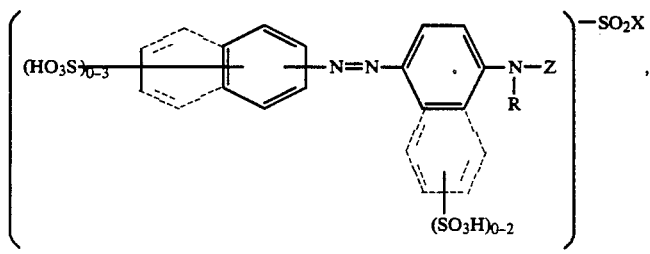
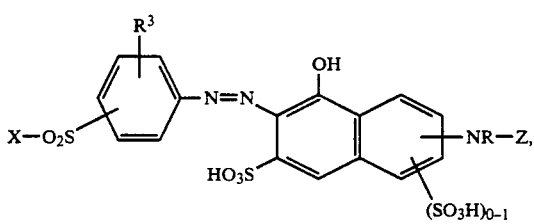
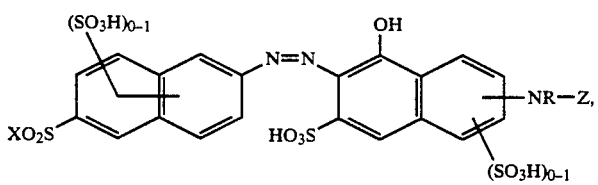
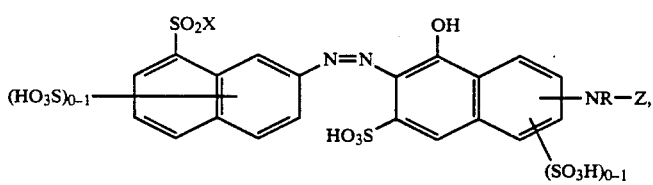
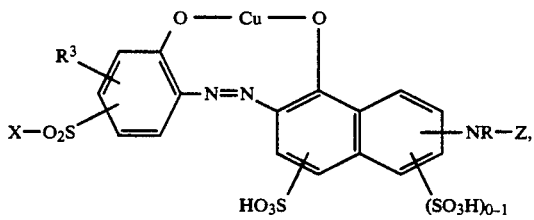
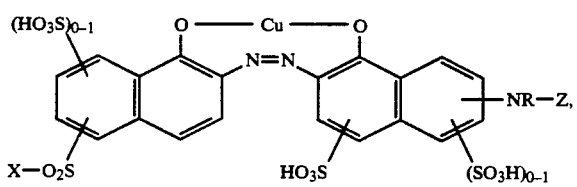

-continued
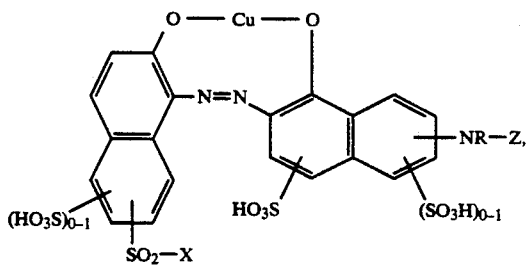
1:2 metal complex of the dyestuff
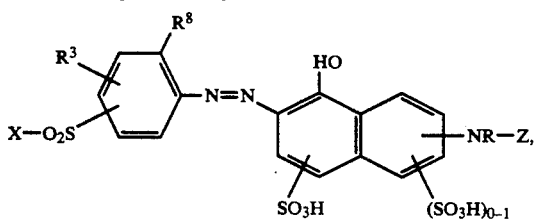
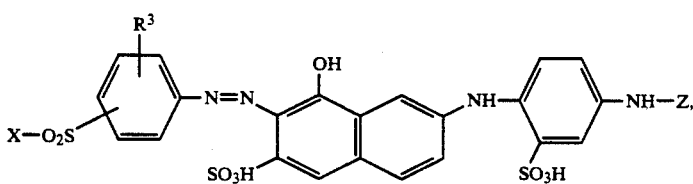
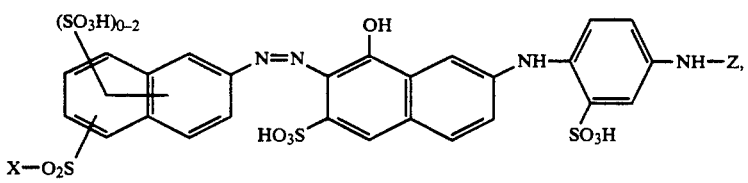
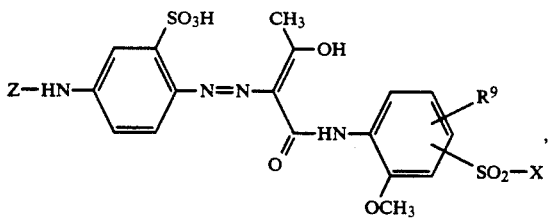
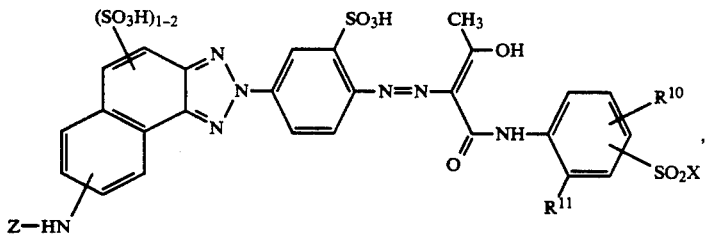
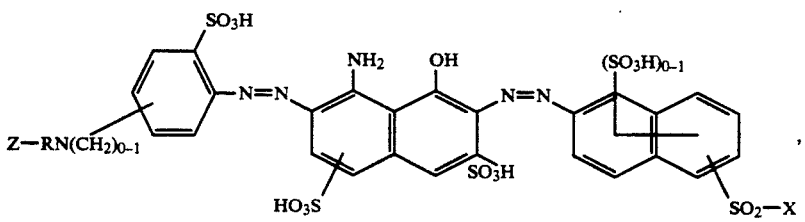

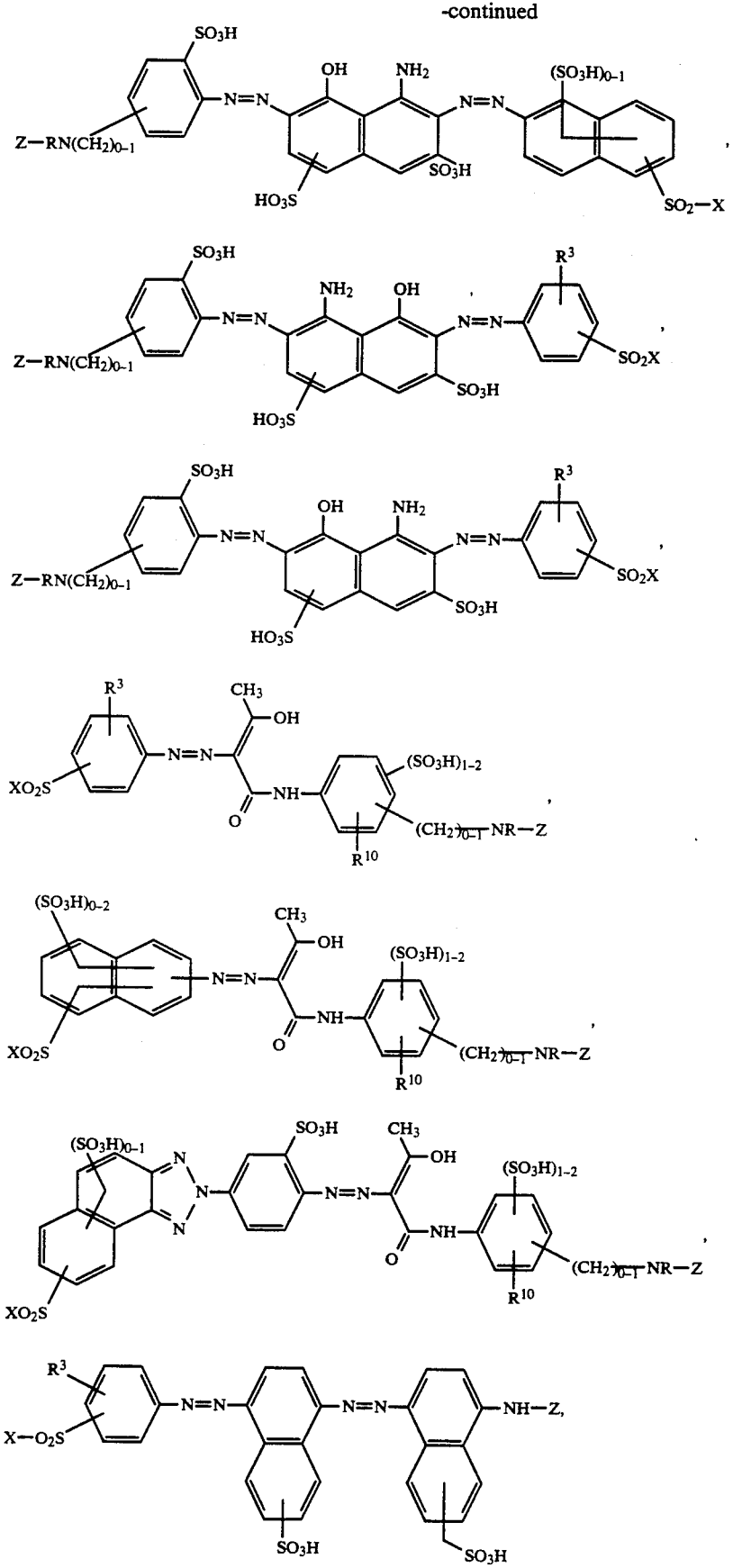

-continued
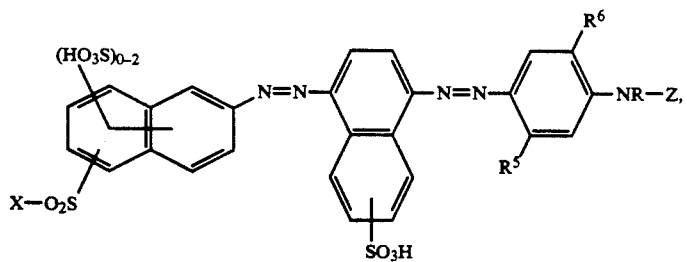
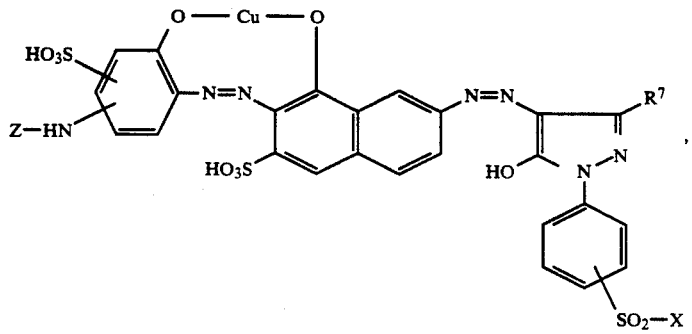
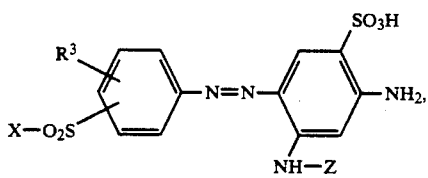
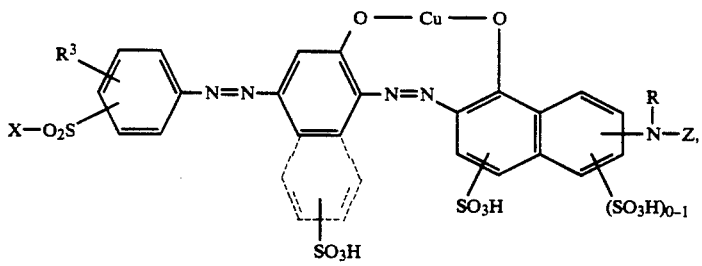
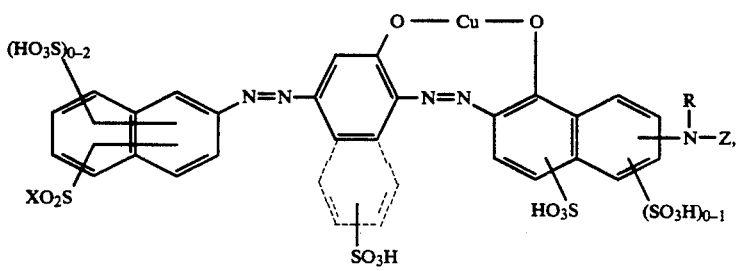

-continued

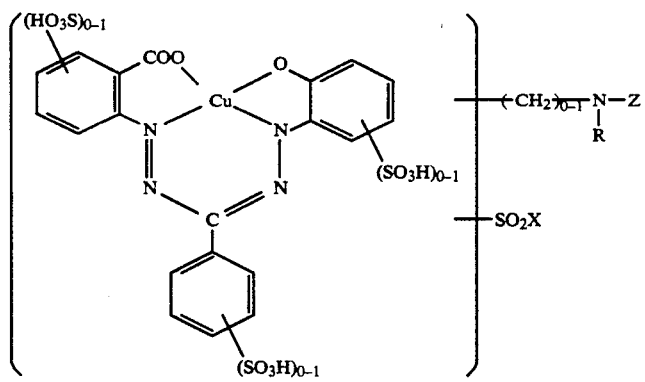

or

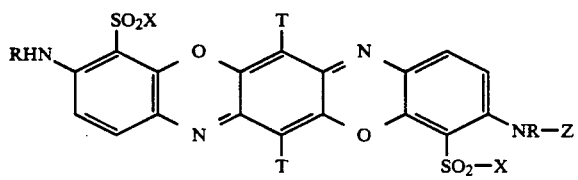

wherein
B'' =

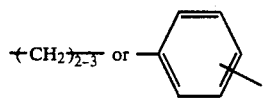

R = H or $C_1$-$C_4$-alkyl, which is unsubstituted or substituted by halogen, hydroxyl, cyano, $C_1$-$C_4$-alkoxy, carboxyl, sulpho or sulphato,
$R_2$ = H, $C_1$-$C_4$-alkyl, $CH_2SO_3H$ or COOH,
$R_3$ = H, $C_1$-$C_4$-alkyl, $C_1$-$C_4$-alkoxy, Cl, Br, COOH or $SO_3H$,
$R_4$ = H, $SO_3H$, $CH_2SO_3H$, Cl, $C_1$-$C_4$-alkylsulphonyl, carboxamide, or carboxylic acid mono- or di-$C_1$-$C_4$-alkylamide,
$R_5$ = H, $C_1$-$C_4$-alkyl, $C_1$-$C_4$-alkoxy, acylamino, arylcarbonylamino, $C_1$-$C_4$-alkylsulphonylamino, Cl, Br, aminocarbonylamino, $C_1$-$C_4$-alkylsulphonylamino or arylsulphonylamino,
$R_6$ = H, $C_1$-$C_4$-alkyl, $C_1$-$C_4$-alkoxy, OH or $SO_3H$,
$R_7$ = $CH_3$ or $CO_2H$,
$R_8$ = OH or COOH,
$R_9$ = H, $OCH_3$ or $CH_3$,
$R_{10}$ = H, $OCH_3$, $CH_3$ or Cl,
$R_{11}$ = H or $OCH_3$,
T = Cl, Br or $CH_3$,
X = $CH_2$=$CH_2$ or $CH_2CH_2$—Y, wherein
Y = $OSO_3H$, $SSO_3H$, $OCOCH_3$, $OPO_3H_2$, $OSO_2CH_3$, SCN, $NHSO_2CH_3$, Cl, Br, F, $OCOC_6H_5$, $OSO_2$—$C_6H_4CH_3$, $+A^-$,

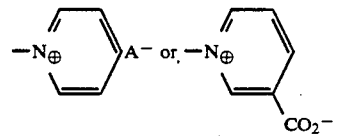

wherein A = halide or sulphate and

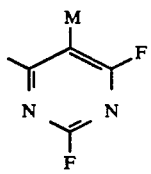

wherein
M = H, $C_1$-$C_4$-alkyl, $C_1$-$C_4$-thioalkyl, F or $CH_3$.

* * * * *

UNITED STATES PATENT AND TRADEMARK OFFICE
CERTIFICATE OF CORRECTION

PATENT NO. : 5,319,074

DATED : June 7, 1994

INVENTOR(S) : Reddig et al.

It is certified that error appears in the above-indentified patent and that said Letters Patent is hereby corrected as shown below:

Title Page  ABSTRACT: After line 16 insert -- ( A = halide or sulphate ) --

Col. 1, lines 43-55  Delete "

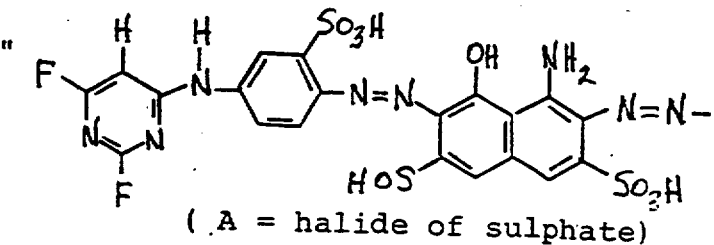

( A = halide of sulphate)

" and substitute --

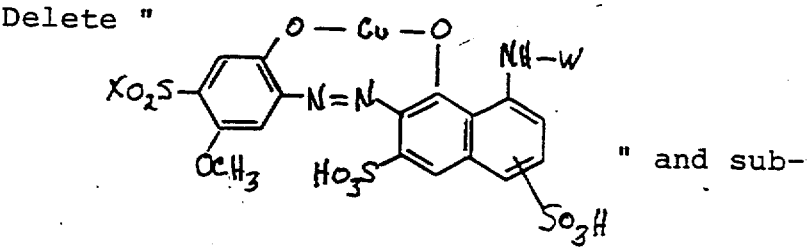

( A = halide of sulphate ) --

Col. 19, last line  Delete "

" and sub-

United States Patent and Trademark Office
CERTIFICATE OF CORRECTION

PATENT NO. : 5,319,074
DATED : June 7, 1994
INVENTOR(S) : Reddig et al.

It is certified that error appears in the above-indentified patent and that said Letters Patent is hereby corrected as shown below:

Col. 19, last line    Delete " 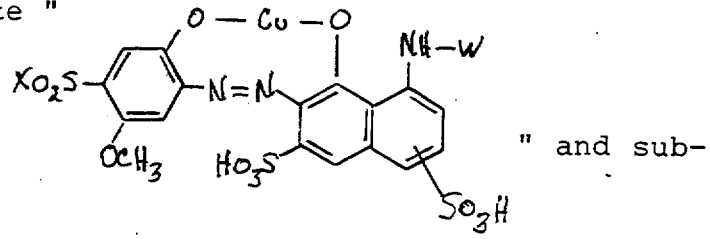 " and sub-

UNITED STATES PATENT AND TRADEMARK OFFICE
CERTIFICATE OF CORRECTION

PATENT NO. : 5,319,074

DATED : June 7, 1994

INVENTOR(S) : Reddig et al.

It is certified that error appears in the above-identified patent and that said Letters Patent is hereby corrected as shown below:

Col. 19, last line Cont'd    stitute -- 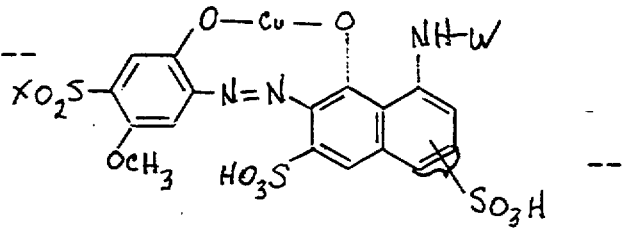 --

Col. 21, line 1    Delete " 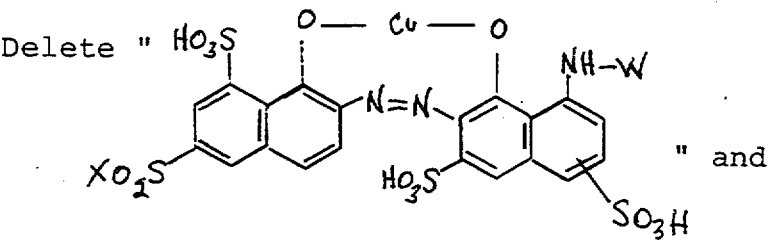 " and substitute -- 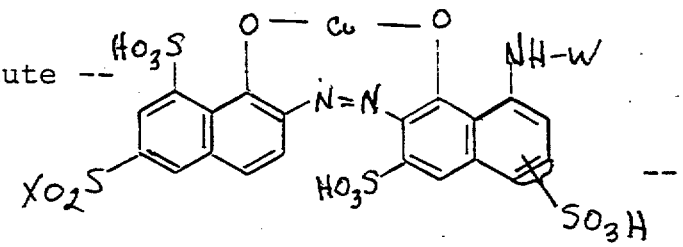 --

UNITED STATES PATENT AND TRADEMARK OFFICE
CERTIFICATE OF CORRECTION

PATENT NO. : 5,319,074
DATED : June 7, 1994
INVENTOR(S) : Reddig et al.

It is certified that error appears in the above-identified patent and that said Letters Patent is hereby corrected as shown below:

Col. 21, line 2   Delete " 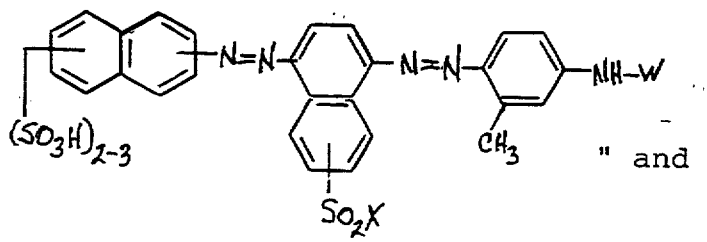 " and substitute -- 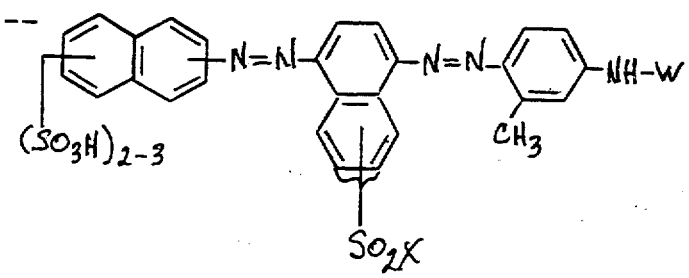

Col. 21, line 3   Delete " 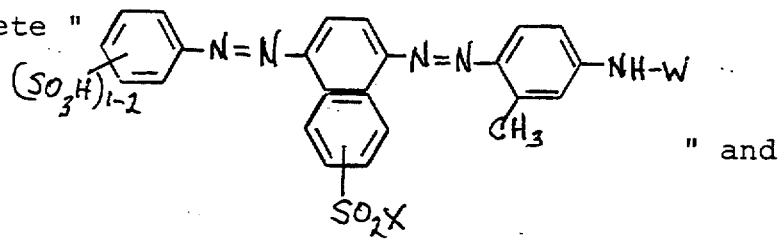 " and

UNITED STATES PATENT AND TRADEMARK OFFICE
CERTIFICATE OF CORRECTION

PATENT NO. : 5,319,074
DATED : June 7, 1994
INVENTOR(S) : Reddig, et al.

It is certified that error appears in the above-identified patent and that said Letters Patent is hereby corrected as shown below:

Col. 21, line 3
 Cont'd          substitute -- 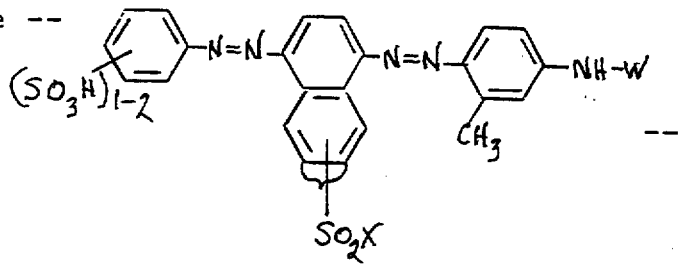 --

Col. 65, line 34    Insert -- ( A halide or sulphate ) --

Col. 71, line 3    Delete " 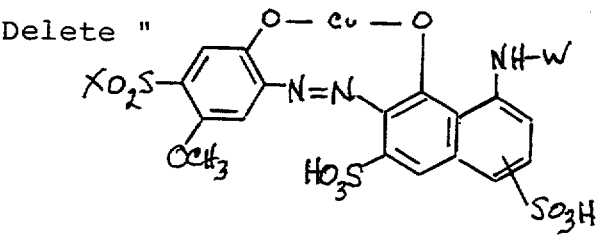 " and substitute -- 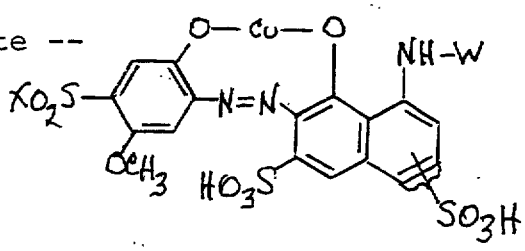 --

UNITED STATES PATENT AND TRADEMARK OFFICE
CERTIFICATE OF CORRECTION

PATENT NO. : 5,319,074
DATED : June 7, 1994
INVENTOR(S) : Reddig, et al.

It is certified that error appears in the above-identified patent and that said Letters Patent is hereby corrected as shown below:

Col. 71, line 4    Delete " 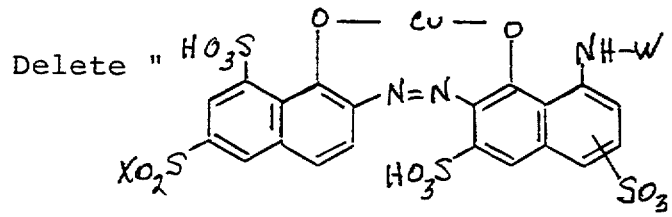 " and -substitute -- 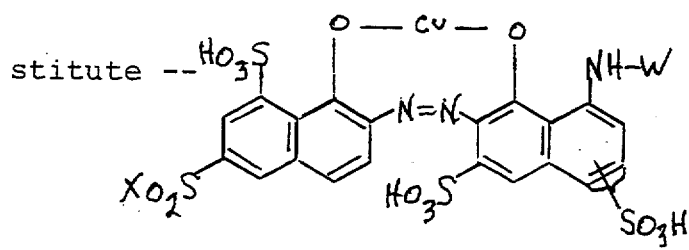 --

Col. 71, line 5    Delete " 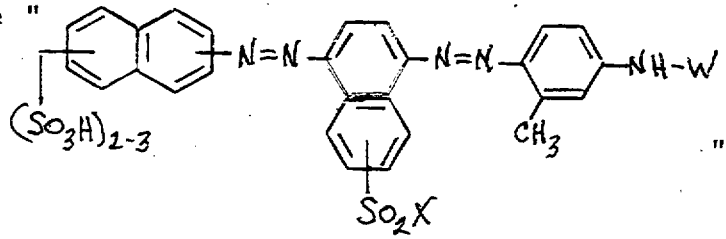 " and substitute -- 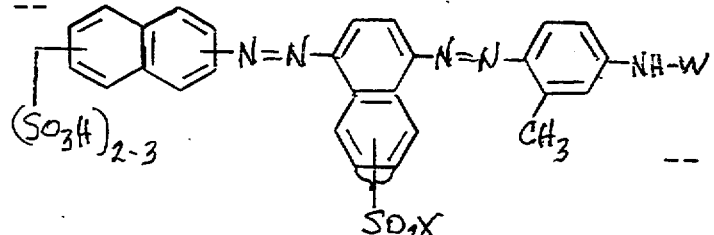 --

UNITED STATES PATENT AND TRADEMARK OFFICE
CERTIFICATE OF CORRECTION

PATENT NO. : 5,319,074
DATED : June 7, 1994
INVENTOR(S) : Reddig, et al.

Page 7 of 8

It is certified that error appears in the above-identified patent and that said Letters Patent is hereby corrected as shown below:

Col. 71, line 6   Delete " 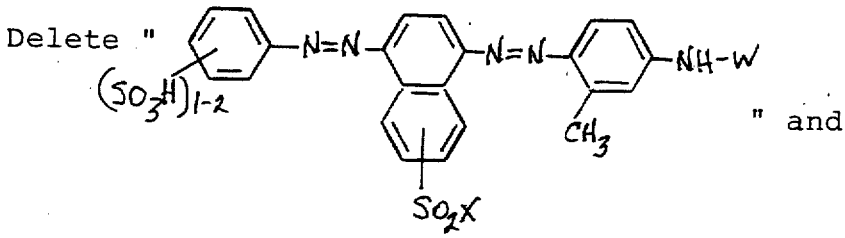 " and substitute -- 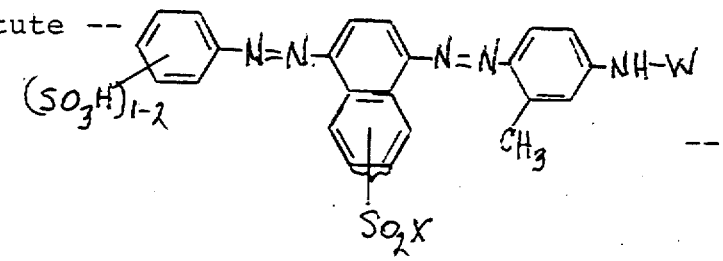 --

Col. 76, line 19   Delete " V " and substitute -- F --

UNITED STATES PATENT AND TRADEMARK OFFICE
CERTIFICATE OF CORRECTION

PATENT NO. : 5,319,074
DATED : June 7, 1994
INVENTOR(S) : Reddig, et al.

It is certified that error appears in the above-indentified patent and that said Letters Patent is hereby corrected as shown below:

Col. 76, line 20    Delete " $C_2$ ", before " $^+A^-$, " insert -- [N(CH$_3$)$_3$] --

Col. 76, line 35    Before formula insert -- W = --

Signed and Sealed this

Fifteenth Day of August, 1995

Attest:

BRUCE LEHMAN

Attesting Officer                Commissioner of Patents and Trademarks